US011662421B2

(12) United States Patent
Manolakos et al.

(10) Patent No.: US 11,662,421 B2
(45) Date of Patent: May 30, 2023

(54) REPORT OF RECEIVE OR TRANSMIT BEAM LOCK INFORMATION

(71) Applicant: QUALCOMM Incorporated, San Diego, CA (US)

(72) Inventors: Alexandros Manolakos, Escondido, CA (US); Sony Akkarakaran, Poway, CA (US)

(73) Assignee: QUALCOMM Incorporated, San Diego, CA (US)

( * ) Notice: Subject to any disclaimer, the term of this patent is extended or adjusted under 35 U.S.C. 154(b) by 327 days.

(21) Appl. No.: 16/983,286

(22) Filed: Aug. 3, 2020

(65) Prior Publication Data

US 2021/0041522 A1 Feb. 11, 2021

(30) Foreign Application Priority Data

Aug. 9, 2019 (GR) ............................... 20190100346

(51) Int. Cl.
*G01S 3/02* (2006.01)
*G01S 5/02* (2010.01)
(Continued)

(52) U.S. Cl.
CPC .......... *G01S 5/0273* (2013.01); *G01S 5/0218* (2020.05); *G01S 5/08* (2013.01); *G01S 5/10* (2013.01);
(Continued)

(58) Field of Classification Search
CPC ........ G01S 3/02; G01S 5/0273; G01S 5/0218; G01S 5/08; G01S 5/10; G01S 5/14; H04W 24/10; H04W 72/048
(Continued)

(56) References Cited

U.S. PATENT DOCUMENTS 9,094,977 B2   7/2015   Li et al.
9,992,725 B2   6/2018   Li et al.
(Continued)

FOREIGN PATENT DOCUMENTS

CA   2368415 C   *   7/2010   ......... H04B 7/18567
CN   104380140 A   *   2/2015   ............... G01S 5/12
(Continued)

OTHER PUBLICATIONS

CATT: "Physical-Layer Procedures to support UE/gNB Measurements", 3GPP Draft, 3GPP TSG RAN WG1 Meeting #97, R1-1906308 NR POS—Procedures, 3rd Generation Partnership Project (3GPP), Mobile Competence Centre, 650, Route Des Lucioles, F-06921 Sophia-Antipolis Cedex, France, vol. RAN WG1, No. Reno, USA, May 13, 2019-May 17, 2019 May 13, 2019 (May 13, 2019), XP051727758, 9 Pages, Retrieved from the Internet: URL:http://www.3gpp.org/ftp/Meetings%5F3GPP%5FSYNC/RAN1/Docs/R1%2D1906308%2Ezip [retrieved on May 13, 2019] Section 1, p. 2, Section 4, p. 8 (Proposal 11).
(Continued)

*Primary Examiner* — Harry K Liu
(74) *Attorney, Agent, or Firm* — Qualcomm Incorporated

(57) ABSTRACT

Disclosed are techniques for wireless communication. In an aspect, a user equipment (UE) receives a positioning measurement request from a network entity, the positioning measurement request including a request to receive and/or to transmit a plurality of positioning reference signals from and/or to one or more transmission-reception points (TRPs) using the same receive (RX) beam and/or transmit (TX) beam, attempts, in response to reception of the positioning measurement request, to use the same RX beam and/or TX beam to receive and/or to transmit the plurality of positioning reference signals to perform positioning measurements, and provides a positioning measurement report to the net-
(Continued)

work entity in response to the positioning measurement request, the positioning measurement report indicating using the same RX beam and/or the same TX beam and/or a degree of success with using the same RX beam and/or the same TX beam.

60 Claims, 14 Drawing Sheets

(51) Int. Cl.
    *H04W 24/10*    (2009.01)
    *H04L 5/00*    (2006.01)
    *G01S 5/08*    (2006.01)
    *G01S 5/10*    (2006.01)
    *G01S 5/14*    (2006.01)
    *H04W 72/04*    (2023.01)

(52) U.S. Cl.
    CPC .............. *G01S 5/14* (2013.01); *H04L 5/0048* (2013.01); *H04L 5/0055* (2013.01); *H04W 24/10* (2013.01); *H04W 72/048* (2013.01)

(58) Field of Classification Search
    USPC .......................................................... 342/453
    See application file for complete search history.

(56) References Cited

U.S. PATENT DOCUMENTS

| | | | |
|---|---|---|---|
| 10,264,478 | B2 | 4/2019 | Li et al. |
| 2019/0052376 | A1 | 2/2019 | Chervyakov et al. |
| 2022/0264278 | A1* | 8/2022 | Edge .................. H04L 65/1104 |

FOREIGN PATENT DOCUMENTS

| | | | |
|---|---|---|---|
| WO | 2018046271 A1 | 3/2018 | |
| WO | 2019096802 A1 | 5/2019 | |
| WO | WO-2019096802 A1 * | 5/2019 | ......... H04B 17/0085 |

OTHER PUBLICATIONS

International Search Report and Written Opinion—PCT/US2020/044866—ISA/EPO—dated Oct. 7, 2020.

Qualcomm Incorporated: "Considerations on Phy-Layer Procedures for NR Positioning", 3GPP Draft, 3GPP TSG RAN WG1 #97, R1-1907299, 3rd Generation Partnership Project (3GPP), Mobile Competence Centre, 650, Route Des Lucioles, F-06921 Sophia-Antipolis Cedex, France, vol. RAN WG1, No. Reno, USA, May 13, 2019-May 17, 2019 May 13, 2019 (May 13, 2019), XP051728739, 10 Pages, Retrieved from the Internet: URL:http://www.3gpp.org/ftp/Meetings%5F3GPP%5FSYNC/RAN1/Docs/R1%2D1907299%2Ezip [retrieved on May 13, 2019], Section 1, p. 1, Section 3, p. 4, Section 4, p. 5.

3GPP TS 36.355: "3rd Generation Partnership Project; Technical Specification Group Radio Access Network; Evolved Universal Terrestrial Radio Access (E-UTRA); LTE Positioning Protocol (LPP) (Release 15)", 3GPP TS 36.355 V15.4.0 (Jun. 2019), pp. 1-222.

Huawei, et al., "Physical Layer Procedure for NR Positioning", R1-1906055, 3GPP TSG RAN WG1 #97, Reno, USA, May 13-17, 2019, 14 Pages.

Qualcomm Incorporated: "Summary of 7.2.10.4: PHY Procedures for Positioning Measurements", 3GPP TSG-RAN WG1 Meeting #97, R1-1907675 (FL Summary for 7.2.10.4—PHY Procedures for Positioning Measurements), 3rd Generation Partnership Project, Mobile Competence Centre, 650, Route Des Lucioles, F-06921, vol. RAN WG1, No. Reno, Nevada, USA, May 13, 2019-May 17, 2019, May 16, 2019, XP051739964, 18 pages.

* cited by examiner

REPORT OF RECEIVE OR TRANSMIT BEAM LOCK INFORMATION

CROSS-REFERENCE TO RELATED APPLICATION

The present Application for Patent claims priority under 35 U.S.C. § 119 to Greek Patent Application No. 20190100346, entitled "REPORT OF RECEIVE OR TRANSMIT BEAM LOCK INFORMATION," filed Aug. 9, 2019, assigned to the assignee hereof, and expressly incorporated herein by reference in its entirety.

BACKGROUND OF THE DISCLOSURE

1. Field of the Disclosure

Various aspects described herein generally relate to wireless communication systems, and more particularly, to report of receive (RX) or transmit (TX) beam lock information, e.g., for angle-based positioning in wireless communication systems.

2. Description of the Related Art

Wireless communication systems have developed through various generations, including a first-generation analog wireless phone service (1G), a second-generation (2G) digital wireless phone service (including interim 2.5G networks), a third-generation (3G) high speed data, Internet-capable wireless service and a fourth-generation (4G) service (e.g., Long-Term Evolution (LTE) or WiMax). There are presently many different types of wireless communication systems in use, including cellular and personal communications service (PCS) systems. Examples of known cellular systems include the cellular Analog Advanced Mobile Phone System (AMPS), and digital cellular systems based on code division multiple access (CDMA), frequency division multiple access (FDMA), time division multiple access (TDMA), the Global System for Mobile communication (GSM), etc.

A fifth generation (5G) wireless standard, referred to as New Radio (NR), enables higher data transfer speeds, greater numbers of connections, and better coverage, among other improvements. The 5G standard, according to the Next Generation Mobile Networks Alliance, is designed to provide data rates of several tens of megabits per second to each of tens of thousands of users, with 1 gigabit per second (gps) to tens of workers on an office floor. Several hundreds of thousands of simultaneous connections should be supported in order to support large wireless deployments. Consequently, the spectral efficiency of 5G mobile communications should be significantly enhanced compared to the current 4G standard. Furthermore, signaling efficiencies should be enhanced and latency should be substantially reduced compared to current standards.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

In an aspect, a method performed by a user equipment (UE) in a multi-beam communication system includes receiving a positioning measurement request from a network entity, the positioning measurement request including a request to receive a plurality of positioning reference signals from one or more transmission-reception points (TRPs) using the same receive (RX) beam, a request to transmit the plurality of positioning reference signals to the one or more TRPs using the same transmit (TX) beam, or both; in response to reception of the positioning measurement request, attempting to use the same RX beam to receive and/or the same TX beam to transmit the plurality of positioning reference signals to perform positioning measurements; and providing a positioning measurement report to the network entity in response to the positioning measurement request, the positioning measurement report indicating using the same RX beam and/or the same TX beam, a degree of success with using the same RX beam and/or the same TX beam, or both.

In an aspect, a method performed by a network entity in a multi-beam communication system includes transmitting a positioning measurement request to a UE, the positioning measurement request including a request to receive a plurality of positioning reference signals from one or more TRPs using the same RX beam, a request to transmit the plurality of positioning reference signals to the one or more TRPs using the same TX beam, or both; and receiving a positioning measurement report from the UE in response to the positioning measurement request, the positioning measurement report indicating using the same RX beam and/or the same TX beam, a degree of success with using the same RX beam and/or the same TX beam, or both.

In an aspect, a UE includes a memory; at least one transceiver; and at least one processor communicatively coupled to the memory and the at least one transceiver, the at least one processor configured to: receive, via the at least one transceiver, a positioning measurement request from a network entity, the positioning measurement request including a request to receive a plurality of positioning reference signals from one or more TRPs using the same RX beam, a request to transmit the plurality of positioning reference signals to the one or more TRPs using the same TX beam, or both; attempt, in response to reception of the positioning measurement request, to use the same RX beam to receive and/or the same TX beam to transmit the plurality of positioning reference signals to perform positioning measurements; and cause the at least one transceiver to transmit a positioning measurement report to the network entity in response to the positioning measurement request, the positioning measurement report indicating using the same RX beam and/or the same TX beam, a degree of success with using the same RX beam and/or the same TX beam, or both.

In an aspect, a network entity includes a memory; a communication device; and at least one processor communicatively coupled to the memory and the communication device, the at least one processor configured to: cause the communication device to transmit a positioning measurement request to a UE, the positioning measurement request including a request to receive a plurality of positioning reference signals from one or more TRPs using the same RX beam, a request to transmit the plurality of positioning reference signals to the one or more TRPs using the same TX beam, or both; and receive, via the communication device, a positioning measurement report from the UE in response to the positioning measurement request, the positioning measurement report indicating using the same RX beam and/or the same TX beam, a degree of success with using the same RX beam and/or the same TX beam, or both.

In an aspect, a UE includes means for receiving a positioning measurement request from a network entity, the positioning measurement request including a request to receive a plurality of positioning reference signals from one or more TRPs using the same RX beam, a request to transmit the plurality of positioning reference signals to the one or more TRPs using the same TX beam, or both; means for attempting, in response to reception of the positioning measurement request, to use the same RX beam to receive and/or the same TX beam to transmit the plurality of positioning reference signals to perform positioning measurements; and means for providing a positioning measurement report to the network entity in response to the positioning measurement request, the positioning measurement report indicating using the same RX beam and/or the same TX beam, a degree of success with using the same RX beam and/or the same TX beam, or both.

In an aspect, a network entity includes means for transmitting a positioning measurement request to a UE, the positioning measurement request including a request to receive a plurality of positioning reference signals from one or more TRPs using the same RX beam, a request to transmit the plurality of positioning reference signals to the one or more TRPs using the same TX beam, or both; and means for receiving a positioning measurement report from the UE in response to the positioning measurement request, the positioning measurement report indicating using the same RX beam and/or the same TX beam, a degree of success with using the same RX beam and/or the same TX beam, or both.

In an aspect, a non-transitory computer-readable medium storing computer-executable instructions includes computer-executable instructions comprising: at least one instruction instructing a UE to receive a positioning measurement request from a network entity, the positioning measurement request including a request to receive a plurality of positioning reference signals from one or more TRPs using the same RX beam, a request to transmit the plurality of positioning reference signals to the one or more TRPs using the same TX beam, or both; at least one instruction instructing the UE to attempt, in response to reception of the positioning measurement request, to use the same RX beam to receive and/or the same TX beam to transmit the plurality of positioning reference signals to perform positioning measurements; and at least one instruction instructing the UE to provide a positioning measurement report to the network entity in response to the positioning measurement request, the positioning measurement report indicating using the same RX beam and/or the same TX beam, a degree of success with using the same RX beam and/or the same TX beam, or both.

In an aspect, a non-transitory computer-readable medium storing computer-executable instructions includes computer-executable instructions comprising: at least one instruction instructing a network entity to transmit a positioning measurement request to a UE, the positioning measurement request including a request to receive a plurality of positioning reference signals from one or more TRPs using the same RX beam, a request to transmit the plurality of positioning reference signals to the one or more TRPs using the same TX beam, or both; and at least one instruction instructing the network entity to receive a positioning measurement report from the UE in response to the positioning measurement request, the positioning measurement report indicating using the same RX beam and/or the same TX beam, a degree of success with using the same RX beam and/or the same TX beam, or both.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of various aspects of the disclosure and are provided solely for illustration of the aspects and not limitation thereof, and in which.

DETAILED DESCRIPTION

Figure 1:
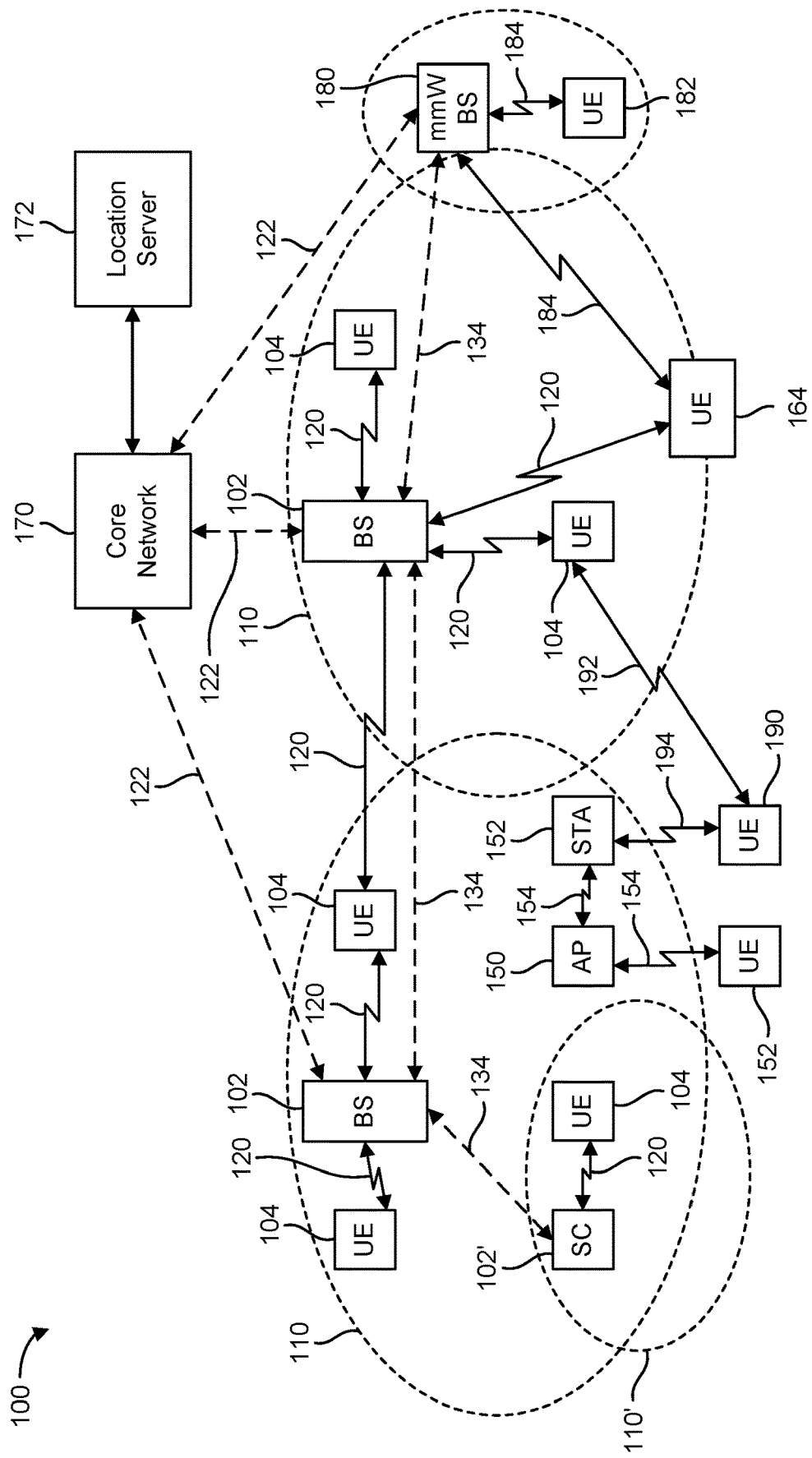
FIG. 1 illustrates an exemplary wireless communications system, according to various aspects of the disclosure.

Various aspects described herein generally relate to wireless communication systems, and more particularly, to the reporting of receive (RX) or transmit (TX) beam lock information, for example, for angle-based positioning in a wireless communication system. In an aspect, a network entity (e.g., a base station, a location server, etc.) may request a UE to perform a beam lock during normal operation of the UE, that is, during operation in which the UE would otherwise change the TX beam and/or the RX beam during transmission and/or reception of a plurality of signals (e.g., physical signals) for communicating with the network entity. The UE in turn may first determine whether it can comply with the request, that is, whether it can perform a beam lock. If so, the UE may perform operations to carry out the request. If not, the UE may report back that it cannot comply with the request. Alternatively, or in addition thereto, the UE may determine to what degree it can comply with the request and report back information indicating the degree of compliance with the request.

These and other aspects are disclosed in the following description and related drawings to show specific examples relating to exemplary aspects. Alternate aspects will be apparent to those skilled in the pertinent art upon reading this disclosure, and may be constructed and practiced without departing from the scope or spirit of the disclosure. Additionally, well-known elements will not be described in detail or may be omitted so as to not obscure the relevant details of the aspects disclosed herein.

The words "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage or mode of operation.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, the sequence(s) of actions described herein can be considered to be embodied entirely within any form of non-transitory computer-readable storage medium having stored therein a corresponding set of computer instructions that, upon execution, would cause or instruct an associated processor of a device to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

As used herein, the terms "user equipment" (UE) and "base station" are not intended to be specific or otherwise limited to any particular radio access technology (RAT), unless otherwise noted. In general, a UE may be any wireless communication device (e.g., a mobile phone, router, tablet computer, laptop computer, tracking device, wearable (e.g., smartwatch, glasses, augmented reality (AR)/virtual reality (VR) headset, etc.), vehicle (e.g., automobile, motorcycle, bicycle, etc.), Internet of Things (IoT) device, etc.) used by a user to communicate over a wireless communications network. A UE may be mobile or may (e.g., at certain times) be stationary, and may communicate with a radio access network (RAN). As used herein, the term "UE" may be referred to interchangeably as an "access terminal" or "AT," a "client device," a "wireless device," a "subscriber device," a "subscriber terminal," a "subscriber station," a "user terminal" or UT, a "mobile device," a "mobile terminal," a "mobile station," or variations thereof.

Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, wireless local area network (WLAN) networks (e.g., based on IEEE 802.11, etc.) and so on.

A base station may operate according to one of several RATs in communication with UEs depending on the network in which it is deployed, and may be alternatively referred to as an access point (AP), a network node, a NodeB, an evolved NodeB (eNB), a next generation eNB (ng-eNB), a New Radio (NR) Node B (also referred to as a gNB or gNodeB), etc. A base station may be used primarily to support wireless access by UEs, including supporting data, voice, and/or signaling connections for the supported UEs. In some systems a base station may provide purely edge node signaling functions while in other systems it may provide additional control and/or network management functions. A communication link through which UEs can send signals to a base station is called an uplink (UL) channel (e.g., a reverse traffic channel, a reverse control channel, an access channel, etc.). A communication link through which the base station can send signals to UEs is called a downlink (DL) or forward link channel (e.g., a paging channel, a control channel, a broadcast channel, a forward traffic channel, etc.). As used herein the term traffic channel (TCH) can refer to either an uplink/reverse or downlink/forward traffic channel The term "base station" may refer to a single physical transmission-reception point (TRP) or to multiple physical TRPs that may or may not be co-located. For example, where the term "base station" refers to a single physical TRP, the physical TRP may be an antenna of the base station corresponding to a cell (or several cell sectors) of the base station. Where the term "base station" refers to multiple co-located physical TRPs, the physical TRPs may be an array of antennas (e.g., as in a multiple-input multiple-output (MIMO) system or where the base station employs beamforming) of the base station. Where the term "base station" refers to multiple non-co-located physical TRPs, the physical TRPs may be a distributed antenna system (DAS) (a network of spatially separated antennas connected to a common source via a transport medium) or a remote radio head (RRH) (a remote base station connected to a serving base station).

Alternatively, the non-co-located physical TRPs may be the serving base station receiving the measurement report from the UE and a neighbor base station whose reference RF signals (or simply "reference signals") the UE is measuring. Because a TRP is the point from which a base station transmits and receives wireless signals, as used herein, references to transmission from or reception at a base station are to be understood as referring to a particular TRP of the base station.

In some implementations that support positioning of UEs, a base station may not support wireless access by UEs (e.g., may not support data, voice, and/or signaling connections for UEs), but may instead transmit reference signals to UEs to be measured by the UEs, and/or may receive and measure signals transmitted by the UEs. Such a base station may be referred to as a positioning beacon (e.g., when transmitting signals to UEs) and/or as a location measurement unit (e.g., when receiving and measuring signals from UEs).

An "RF signal" comprises an electromagnetic wave of a given frequency that transports information through the space between a transmitter and a receiver. As used herein, a transmitter may transmit a single "RF signal" or multiple "RF signals" to a receiver. However, the receiver may receive multiple "RF signals" corresponding to each transmitted RF signal due to the propagation characteristics of RF signals through multipath channels. The same transmitted RF signal on different paths between the transmitter and receiver may be referred to as a "multipath" RF signal. As used herein, an RF signal may also be referred to as a "wireless signal" or simply a "signal" where it is clear from the context that the term "signal" refers to a wireless signal or an RF signal.

According to various aspects, FIG. 1 illustrates an exemplary wireless communications system 100. The wireless communications system 100 (which may also be referred to as a wireless wide area network (WWAN)) may include various base stations 102 (labeled "BS") and various UEs 104. The base stations 102 may include macro cell base stations (high power cellular base stations) and/or small cell base stations (low power cellular base stations). In an aspect, the macro cell base station may include eNBs and/or ng-eNBs where the wireless communications system 100 corresponds to an LTE network, or gNBs where the wireless communications system 100 corresponds to an NR network, or a combination of both, and the small cell base stations may include femtocells, picocells, microcells, etc.

The base stations 102 may collectively form a RAN and interface with a core network 170 (e.g., an evolved packet core (EPC) or a 5G core (5GC)) through backhaul links 122, and through the core network 170 to one or more location servers 172 (which may be part of core network 170 or may be external to core network 170). In addition to other functions, the base stations 102 may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages. The base stations 102 may communicate with each other directly or indirectly (e.g., through the EPC/5GC) over backhaul links 134, which may be wired or wireless.

The base stations 102 may wirelessly communicate with the UEs 104. Each of the base stations 102 may provide communication coverage for a respective geographic coverage area 110. In an aspect, one or more cells may be supported by a base station 102 in each geographic coverage area 110. A "cell" is a logical communication entity used for communication with a base station (e.g., over some frequency resource, referred to as a carrier frequency, component carrier, carrier, band, or the like), and may be associated with an identifier (e.g., a physical cell identifier (PCI), a virtual cell identifier (VCI), a cell global identifier (CGI)) for distinguishing cells operating via the same or a different carrier frequency. In some cases, different cells may be configured according to different protocol types (e.g., machine-type communication (MTC), narrowband IoT (NB-IoT), enhanced mobile broadband (eMBB), or others) that may provide access for different types of UEs. Because a cell is supported by a specific base station, the term "cell" may refer to either or both of the logical communication entity and the base station that supports it, depending on the context. In addition, because a TRP is typically the physical transmission point of a cell, the terms "cell" and "TRP" may be used interchangeably. In some cases, the term "cell" may also refer to a geographic coverage area of a base station (e.g., a sector), insofar as a carrier frequency can be detected and used for communication within some portion of geographic coverage areas 110.

While neighboring macro cell base station 102 geographic coverage areas 110 may partially overlap (e.g., in a handover region), some of the geographic coverage areas 110 may be substantially overlapped by a larger geographic coverage area 110. For example, a small cell base station 102' (labeled "SC") may have a geographic coverage area 110' that substantially overlaps with the geographic coverage area 110 of one or more macro cell base stations 102. A network that includes both small cell and macro cell base stations may be known as a heterogeneous network. A heterogeneous network may also include home eNBs (HeNBs), which may provide service to a restricted group known as a closed subscriber group (CSG).

The communication links 120 between the base stations 102 and the UEs 104 may include uplink (also referred to as reverse link) transmissions from a UE 104 to a base station 102 and/or downlink (also referred to as forward link) transmissions from a base station 102 to a UE 104. The communication links 120 may use MIMO antenna technology, including spatial multiplexing, beamforming, and/or transmit diversity. The communication links 120 may be through one or more carrier frequencies. Allocation of carriers may be asymmetric with respect to downlink and uplink (e.g., more or less carriers may be allocated for downlink than for uplink).

The wireless communications system 100 may further include a wireless local area network (WLAN) access point (AP) 150 in communication with one or more WLAN stations (STAs) 152 (labeled "STA") via communication links 154 in an unlicensed frequency spectrum (e.g., 5 GHz). When communicating in an unlicensed frequency spectrum, the WLAN STAs 152 and/or the WLAN AP 150 may perform a clear channel assessment (CCA) or listen before talk (LBT) procedure prior to communicating in order to determine whether the channel is available.

The small cell base station 102' may operate in a licensed and/or an unlicensed frequency spectrum. When operating in an unlicensed frequency spectrum, the small cell base station 102' may employ LTE or NR technology and use the same 5 GHz unlicensed frequency spectrum as used by the WLAN AP 150. The small cell base station 102', employing LTE/5G in an unlicensed frequency spectrum, may boost coverage to and/or increase capacity of the access network. NR in unlicensed spectrum may be referred to as NR-U. LTE in an unlicensed spectrum may be referred to as LTE-U, licensed assisted access (LAA), or MulteFire.

The wireless communications system 100 may further include a millimeter wave (mmW) base station 180 that may operate in mmW frequencies and/or near mmW frequencies in communication with a UE 182. Extremely high frequency (EHF) is part of the RF in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band have a high path loss and a relatively short range. The mmW base station 180 and the UE 182 may utilize beamforming (transmit and/or receive) over an mmW communication link 184 to compensate for the extremely high path loss and short range. Further, it will be appreciated that in alternative configurations, one or more base stations 102 may also transmit using mmW or near mmW and beamforming. Accordingly, it will be appreciated that the foregoing illustrations are merely examples and should not be construed to limit the various aspects disclosed herein.

Transmit beamforming is a technique for focusing an RF signal in a specific direction. Traditionally, when a network node (e.g., a base station) broadcasts an RF signal, it broadcasts the signal in all directions (omni-directionally). With transmit beamforming, the network node determines where a given target device (e.g., a UE) is located (relative to the transmitting network node) and projects a stronger downlink RF signal in that specific direction, thereby providing a faster (in terms of data rate) and stronger RF signal for the receiving device(s). To change the directionality of the RF signal when transmitting, a network node can control the phase and relative amplitude of the RF signal at each of the one or more transmitters that are broadcasting the RF signal. For example, a network node may use an array of antennas (referred to as a "phased array" or an "antenna array") that creates a beam of RF waves that can be "steered" to point in different directions, without actually moving the antennas. Specifically, the RF current from the transmitter is fed to the individual antennas with the correct phase relationship so that the radio waves from the separate antennas add together to increase the radiation in a desired direction, while cancelling to suppress radiation in undesired directions.

Transmit beams may be quasi-collocated, meaning that they appear to the receiver (e.g., a UE) as having the same parameters, regardless of whether or not the transmitting antennas of the network node themselves are physically collocated. In NR, there are four types of quasi-collocation (QCL) relations. Specifically, a QCL relation of a given type means that certain parameters about a second reference signal on a second beam can be derived from information about a source reference signal on a source beam. Thus, if the source reference signal is QCL Type A, the receiver can use the source reference signal to estimate the Doppler shift, Doppler spread, average delay, and delay spread of a second reference signal transmitted on the same channel If the source reference signal is QCL Type B, the receiver can use the source reference signal to estimate the Doppler shift and Doppler spread of a second reference signal transmitted on the same channel If the source reference signal is QCL Type C, the receiver can use the source reference signal to estimate the Doppler shift and average delay of a second reference signal transmitted on the same channel If the source reference signal is QCL Type D, the receiver can use the source reference signal to estimate the spatial receive parameter of a second reference signal transmitted on the same channel In receive beamforming, the receiver uses a receive beam to amplify RF signals detected on a given channel For example, the receiver can increase the gain setting and/or adjust the phase setting of an array of antennas in a particular direction to amplify (e.g., to increase the gain level of) the RF signals received from that direction. Thus, when a receiver is said to beamform in a certain direction, it means the beam gain in that direction is high relative to the beam gain along other directions, or the beam gain in that direction is the highest compared to the beam gain in that direction of all other receive beams available to the receiver. This results in a stronger received signal strength (e.g., reference signal received power (RSRP), reference signal received quality (RSRQ), signal-to-interference-plus-noise ratio (SINR), etc.) of the RF signals received from that direction.

Transmit and receive beams may be spatially related. A spatial relation means that parameters for a second beam (e.g., a transmit beam or a receive beam) for a second reference signal can be derived from information about a first beam (e.g., a receive beam or a transmit beam) for a first reference signal. For example, a UE may use a particular receive beam to receive a reference downlink reference signal (e.g., synchronization signal block (SSB)) from a base station. The UE can then form a transmit beam for sending an uplink reference signal (e.g., sounding reference signal (SRS)) to that base station based on the parameters of the receive beam.

Note that a "downlink" beam may be either a transmit beam or a receive beam, depending on the entity forming it. For example, if a base station is forming the downlink beam to transmit a reference signal to a UE, the downlink beam is a transmit beam. If the UE is forming the downlink beam, however, it is a receive beam to receive the downlink reference signal. Similarly, an "uplink" beam may be either a transmit beam or a receive beam, depending on the entity forming it. For example, if a base station is forming the uplink beam, it is an uplink receive beam, and if a UE is forming the uplink beam, it is an uplink transmit beam.

In 5G, the frequency spectrum in which wireless nodes (e.g., base stations 102/180, UEs 104/182) operate is divided into multiple frequency ranges, FR1 (from 450 to 6000 MHz), FR2 (from 24250 to 52600 MHz), FR3 (above 52600 MHz), and FR4 (between FR1 and FR2). In a multi-carrier system, such as 5G, one of the carrier frequencies is referred to as the "primary carrier" or "anchor carrier" or "primary serving cell" or "PCell," and the remaining carrier frequencies are referred to as "secondary carriers" or "secondary serving cells" or "SCells." In carrier aggregation, the anchor carrier is the carrier operating on the primary frequency (e.g., FR1) utilized by a UE 104/182 and the cell in which the UE 104/182 either performs the initial radio resource control (RRC) connection establishment procedure or initiates the RRC connection re-establishment procedure. The primary carrier carries all common and UE-specific control channels, and may be a carrier in a licensed frequency (however, this is not always the case). A secondary carrier is a carrier operating on a secondary frequency (e.g., FR2) that may be configured once the RRC connection is established between the UE 104 and the anchor carrier and that may be used to provide additional radio resources. In some cases, the secondary carrier may be a carrier in an unlicensed frequency. The secondary carrier may contain only necessary signaling information and signals, for example, those that are UE-specific may not be present in the secondary carrier, since both primary uplink and downlink carriers are typically UE-specific. This means that different UEs 104/182 in a cell may have different downlink primary carriers. The same is true for the uplink primary carriers. The network is able to change the primary carrier of any UE 104/182 at any time. This is done, for example, to balance the load on different carriers. Because a "serving cell" (whether a PCell or an SCell) corresponds to a carrier frequency/component carrier over which some base station is communicating, the term "cell," "serving cell," "component carrier," "carrier frequency," and the like can be used interchangeably.

For example, still referring to FIG. 1, one of the frequencies utilized by the macro cell base stations 102 may be an anchor carrier (or "PCell") and other frequencies utilized by the macro cell base stations 102 and/or the mmW base station 180 may be secondary carriers ("SCells"). The simultaneous transmission and/or reception of multiple carriers enables the UE 104/182 to significantly increase its data transmission and/or reception rates. For example, two 20 MHz aggregated carriers in a multi-carrier system would theoretically lead to a two-fold increase in data rate (i.e., 40 MHz), compared to that attained by a single 20 MHz carrier.

The wireless communications system 100 may further include one or more UEs, such as UE 190, that connects indirectly to one or more communication networks via one or more device-to-device (D2D) peer-to-peer (P2P) links. In the example of FIG. 1, UE 190 has a D2D P2P link 192 with one of the UEs 104 connected to one of the base stations 102 (e.g., through which UE 190 may indirectly obtain cellular connectivity) and a D2D P2P link 194 with WLAN STA 152 connected to the WLAN AP 150 (through which UE 190 may indirectly obtain WLAN-based Internet connectivity). In an example, the D2D P2P links 192 and 194 may be supported with any well-known D2D RAT, such as LTE Direct (LTE-D), WiFi Direct (WiFi-D), Bluetooth®, and so on.

The wireless communications system 100 may further include a UE 164 that may communicate with a macro cell base station 102 over a communication link 120 and/or the mmW base station 180 over an mmW communication link 184. For example, the macro cell base station 102 may support a PCell and one or more SCells for the UE 164 and the mmW base station 180 may support one or more SCells for the UE 164.

Figure 2A:
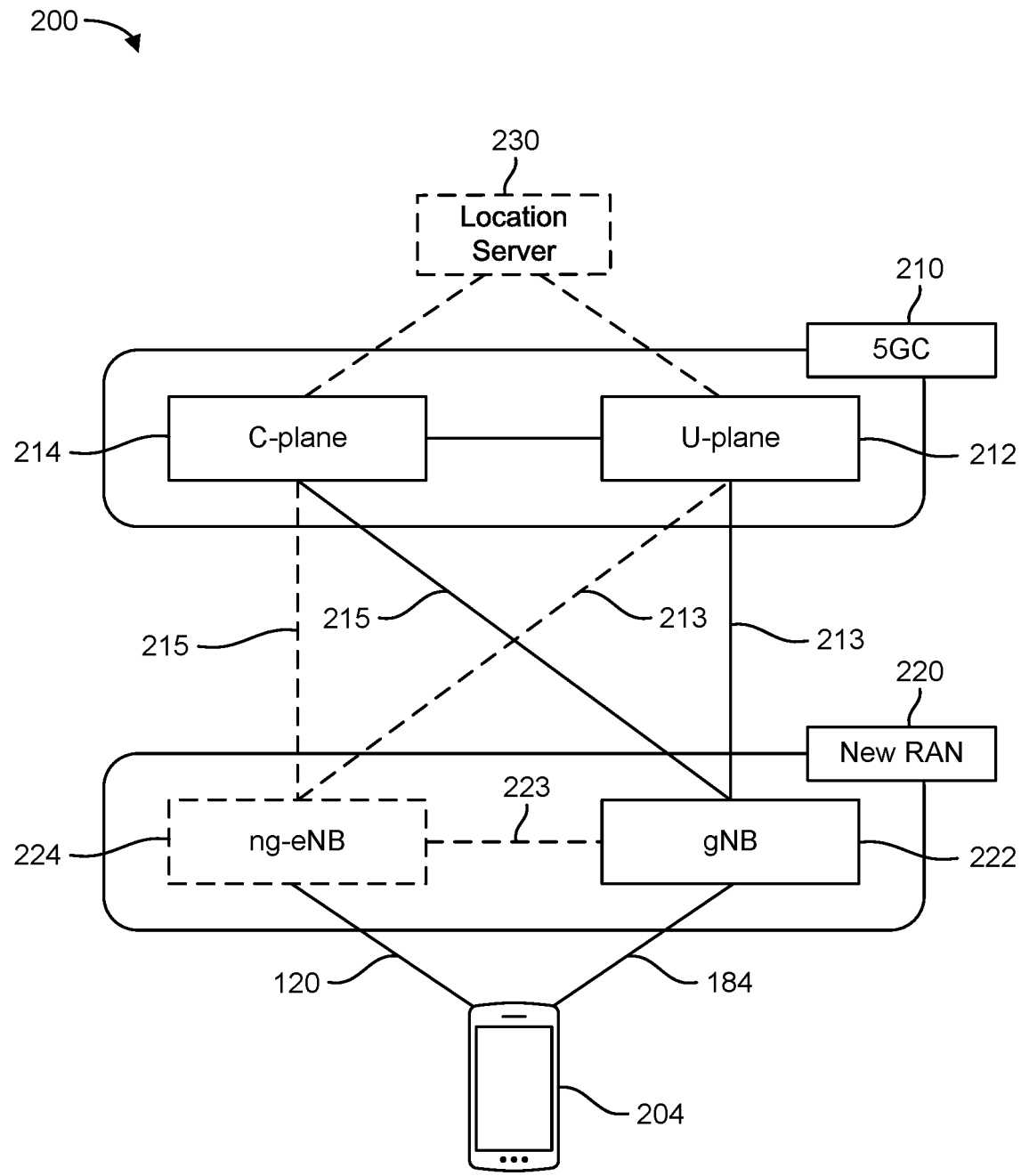
FIGS. 2A and 2B illustrate exemplary wireless network structures, according to various aspects of the disclosure.

According to various aspects, FIG. 2A illustrates an exemplary wireless network structure 200. For example, a 5GC 210 (also referred to as a Next Generation Core (NGC)) can be viewed functionally as control plane functions (C-plane) 214 (e.g., UE registration, authentication, network access, gateway selection, etc.) and user plane functions (U-plane) 212 (e.g., UE gateway function, access to data networks, IP routing, etc.), which operate cooperatively to form the core network. User plane interface (NG-U) 213 and control plane interface (NG-C) 215 connect the gNB 222 to the 5GC 210 and specifically to user plane functions 212 and the control plane functions 214, respectively. In an additional configuration, an ng-eNB 224 may also be connected to the 5GC 210 via NG-C 215 to the control plane functions 214 and NG-U 213 to user plane functions 212. Further, ng-eNB 224 may directly communicate with gNB 222 via a backhaul connection 223. In some configurations, the New RAN 220 may only have one or more gNBs 222, while other configurations include one or more of both ng-eNBs 224 and gNBs 222. Either gNB 222 or ng-eNB 224 may communicate with UEs 204 (e.g., any of the UEs depicted in FIG. 1). Another optional aspect may include location server 230, which may be in communication with the 5GC 210 to provide location assistance for UEs 204. The location server 230 can be implemented as a plurality of separate servers (e.g., physically separate servers, different software modules on a single server, different software modules spread across multiple physical servers, etc.), or alternately may each correspond to a single server. The location server 230 can be configured to support one or more location services for UEs 204 that can connect to the location server 230 via the core network, 5GC 210, and/or via the Internet (not illustrated). Further, the location server 230 may be integrated into a component of the core network, or alternatively may be external to the core network.

Figure 2B:
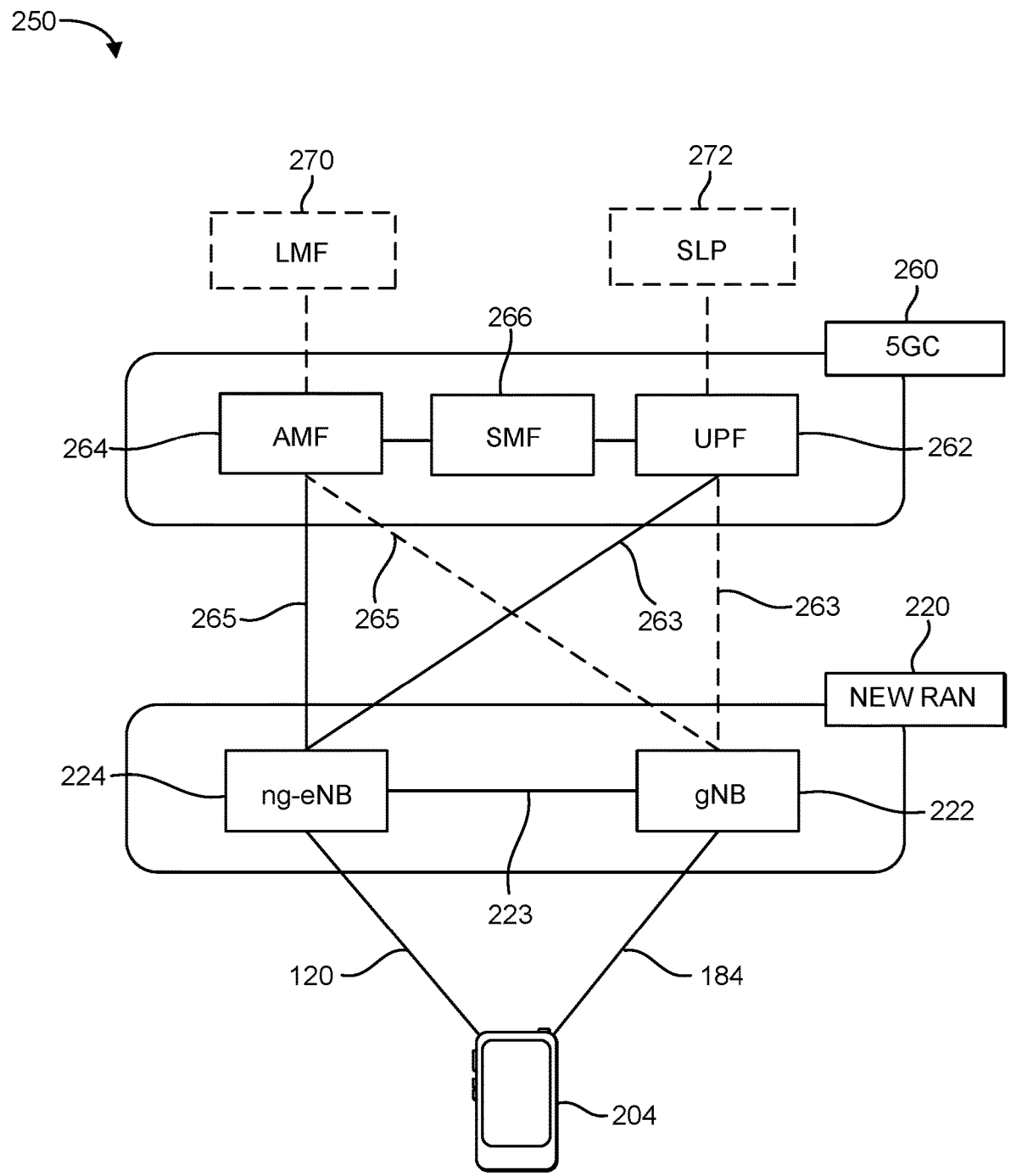

According to various aspects, FIG. 2B illustrates another exemplary wireless network structure 250. For example, a 5GC 260 can be viewed functionally as control plane functions, provided by an access and mobility management function (AMF) 264, and user plane functions, provided by a user plane function (UPF) 262, which operate cooperatively to form the core network (i.e., 5GC 260). User plane interface 263 and control plane interface 265 connect the ng-eNB 224 to the 5GC 260 and specifically to UPF 262 and AMF 264, respectively. In an additional configuration, a gNB 222 may also be connected to the 5GC 260 via control plane interface 265 to AMF 264 and user plane interface 263 to UPF 262. Further, ng-eNB 224 may directly communicate with gNB 222 via the backhaul connection 223, with or without gNB direct connectivity to the 5GC 260. In some configurations, the New RAN 220 may only have one or more gNBs 222, while other configurations include one or more of both ng-eNBs 224 and gNBs 222. Either gNB 222 or ng-eNB 224 may communicate with UEs 204 (e.g., any of the UEs depicted in FIG. 1). The base stations of the New RAN 220 communicate with the AMF 264 over the N2 interface and with the UPF 262 over the N3 interface.

The functions of the AMF 264 include registration management, connection management, reachability management, mobility management, lawful interception, transport for session management (SM) messages between the UE 204 and a session management function (SMF) 266, transparent proxy services for routing SM messages, access authentication and access authorization, transport for short message service (SMS) messages between the UE 204 and the short message service function (SMSF) (not shown), and security anchor functionality (SEAF). The AMF 264 also interacts with an authentication server function (AUSF) (not shown) and the UE 204, and receives the intermediate key that was established as a result of the UE 204 authentication process. In the case of authentication based on a UMTS (universal mobile telecommunications system) subscriber identity module (USIM), the AMF 264 retrieves the security material from the AUSF. The functions of the AMF 264 also include security context management (SCM). The SCM receives a key from the SEAF that it uses to derive access-network specific keys. The functionality of the AMF 264 also includes location services management for regulatory services, transport for location services messages between the UE 204 and a location management function (LMF) 270 (which acts as a location server 230), transport for location services messages between the New RAN 220 and the LMF 270, evolved packet system (EPS) bearer identifier allocation for interworking with the EPS, and UE 204 mobility event notification. In addition, the AMF 264 also supports functionalities for non-3GPP access networks.

Functions of the UPF 262 include acting as an anchor point for intra-/inter-RAT mobility (when applicable), acting as an external protocol data unit (PDU) session point of interconnect to a data network (not shown), providing packet routing and forwarding, packet inspection, user plane policy rule enforcement (e.g., gating, redirection, traffic steering), lawful interception (user plane collection), traffic usage reporting, quality of service (QoS) handling for the user plane (e.g., UL/DL rate enforcement, reflective QoS marking in the DL), uplink traffic verification (service data flow (SDF) to QoS flow mapping), transport level packet marking in the uplink and downlink, downlink packet buffering and downlink data notification triggering, and sending and forwarding of one or more "end markers" to the source RAN node. The UPF 262 may also support transfer of location services messages over a user plane between the UE 204 and a location server, such as a secure user plane location (SUPL) location platform (SLP) 272.

The functions of the SMF 266 include session management, UE Internet protocol (IP) address allocation and management, selection and control of user plane functions, configuration of traffic steering at the UPF 262 to route traffic to the proper destination, control of part of policy enforcement and QoS, and downlink data notification. The interface over which the SMF 266 communicates with the AMF 264 is referred to as the N11 interface.

Another optional aspect may include an LMF 270, which may be in communication with the 5GC 260 to provide location assistance for UEs 204. The LMF 270 can be implemented as a plurality of separate servers (e.g., physically separate servers, different software modules on a single server, different software modules spread across multiple physical servers, etc.), or alternately may each correspond to a single server. The LMF 270 can be configured to support one or more location services for UEs 204 that can connect to the LMF 270 via the core network, 5GC 260, and/or via the Internet (not illustrated). The SLP 272 may support similar functions to the LMF 270, but while the LMF 270 may communicate with the AMF 264, New RAN 220, and UEs 204 over a control plane (e.g., using interfaces and protocols intended to convey signaling messages and not voice or data), the SLP 272 may communicate with UEs 204 and external clients (not shown in FIG. 2B) over a user plane (e.g., using protocols intended to carry voice and/or data like the transmission control protocol (TCP) and/or IP).

Figure 3A:
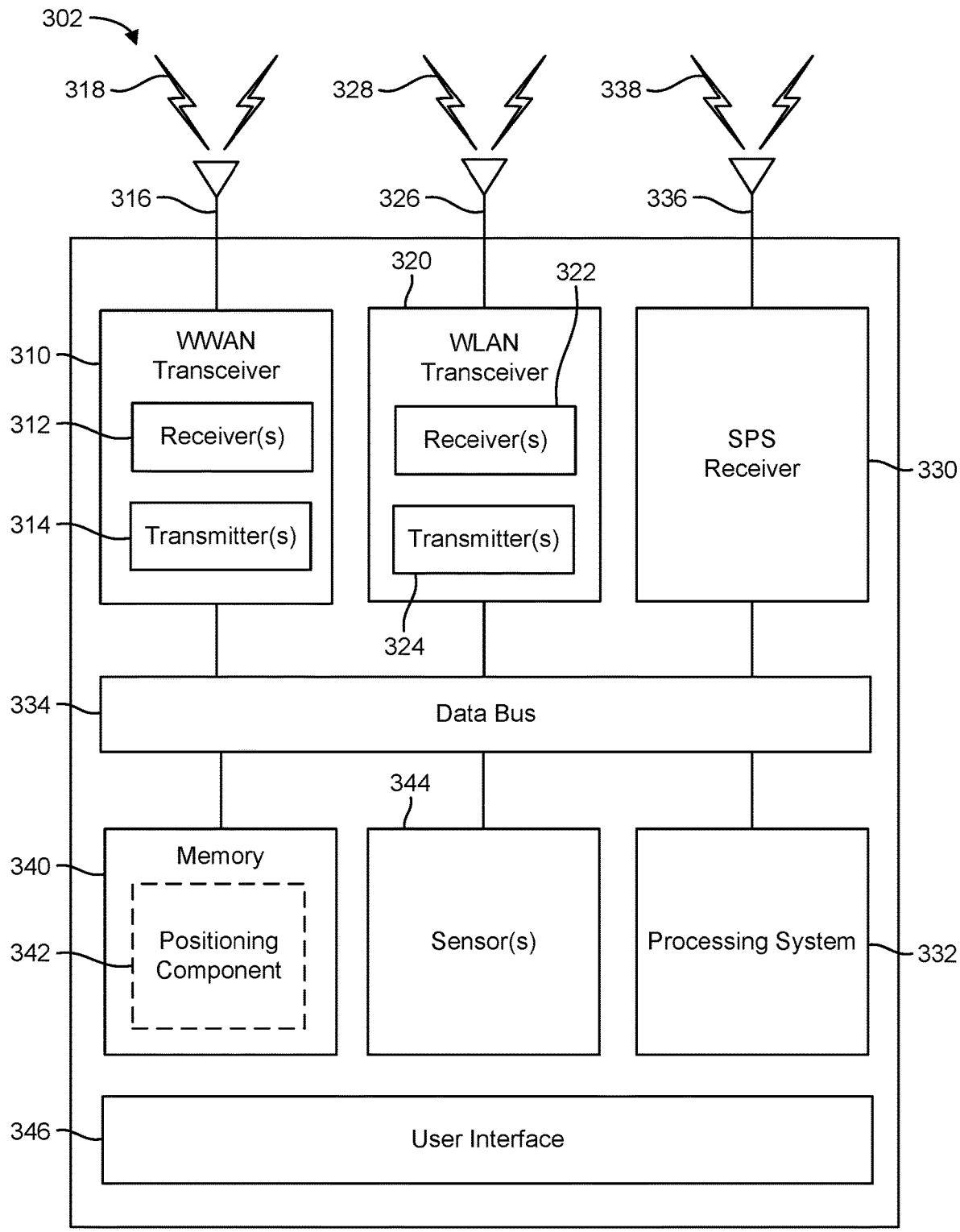
FIGS. 3A to 3C are simplified block diagrams of several exemplary aspects of components that may be employed in a UE, a base station, and a network entity, respectively, according to aspects of the disclosure.
Figure 3B:
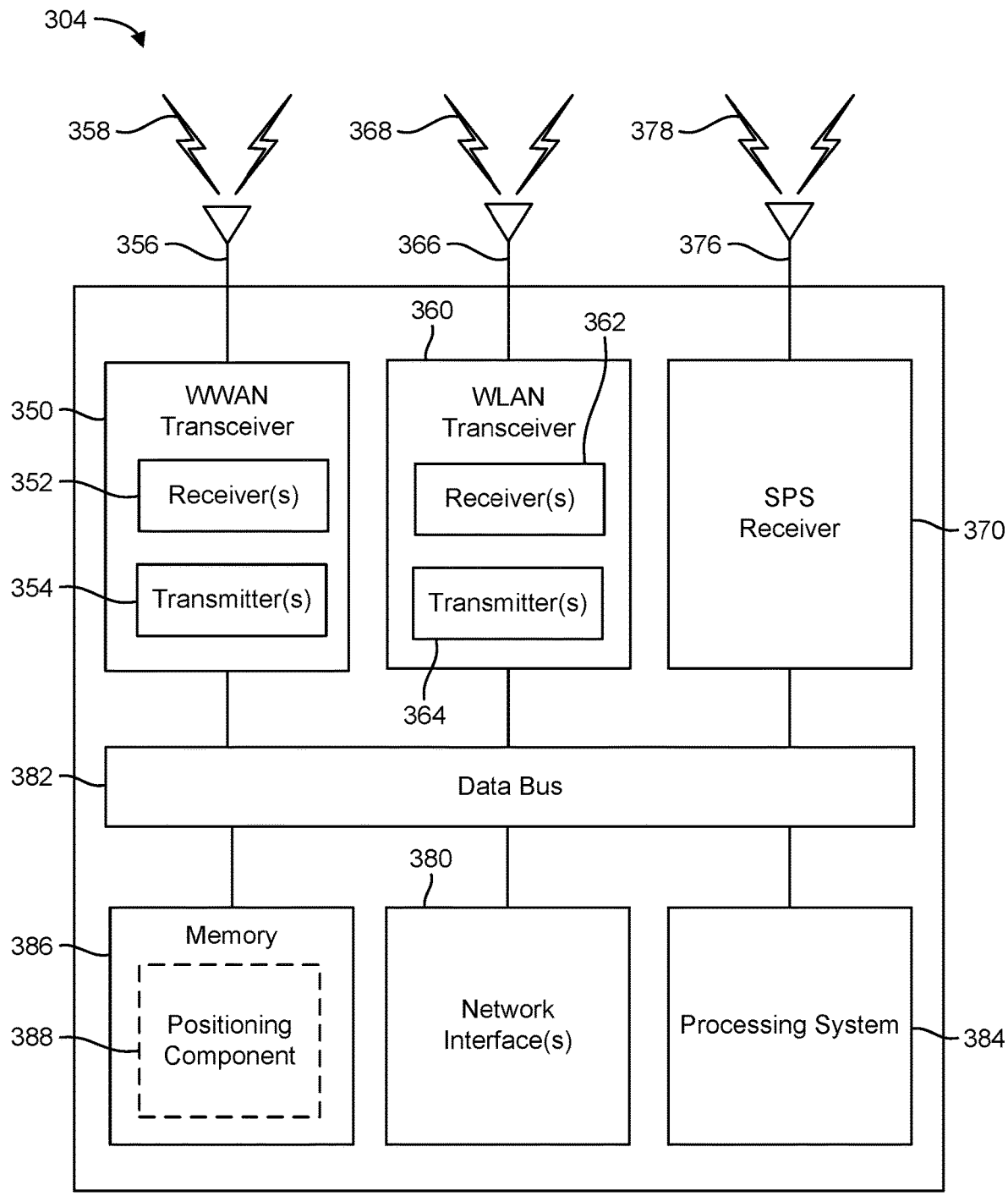
Figure 3C:
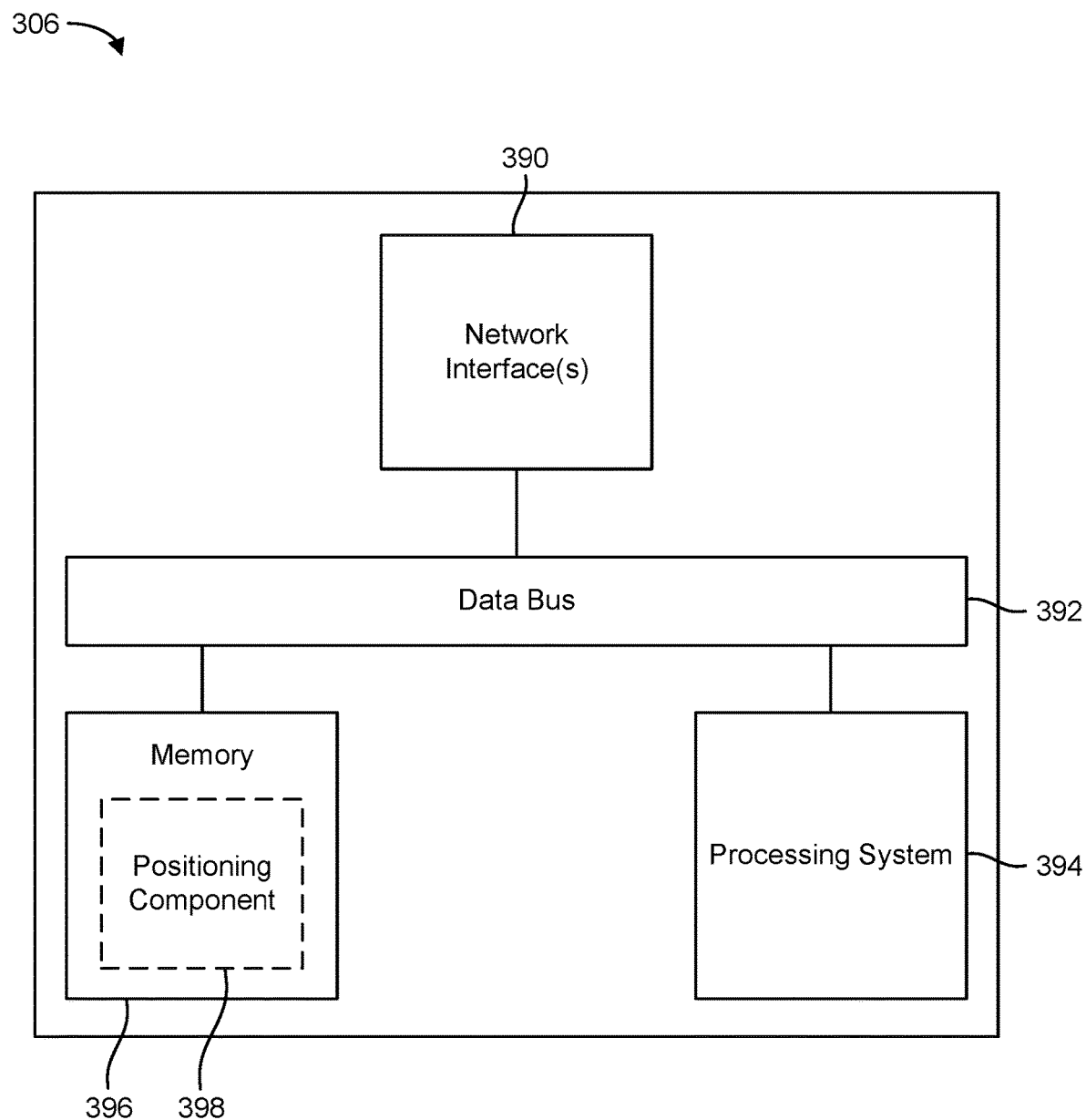

FIGS. 3A, 3B, and 3C illustrate several exemplary components (represented by corresponding blocks) that may be incorporated into a UE 302 (which may correspond to any of the UEs described herein), a base station 304 (which may correspond to any of the base stations described herein), and a network entity 306 (which may correspond to or embody any of the network functions described herein, including the location server 230, the LMF 270, and the SLP 272) to support the file transmission operations as taught herein. It will be appreciated that these components may be implemented in different types of apparatuses in different implementations (e.g., in an ASIC, in a system-on-chip (SoC), etc.). The illustrated components may also be incorporated into other apparatuses in a communication system. For example, other apparatuses in a system may include components similar to those described to provide similar functionality. Also, a given apparatus may contain one or more of the components. For example, an apparatus may include multiple transceiver components that enable the apparatus to operate on multiple carriers and/or communicate via different technologies.

The UE 302 and the base station 304 each include wireless wide area network (WWAN) transceiver 310 and 350, respectively, configured to communicate via one or more wireless communication networks (not shown), such as an NR network, an LTE network, a GSM network, and/or the like. The WWAN transceivers 310 and 350 may be connected to one or more antennas 316 and 356, respectively, for communicating with other network nodes, such as other UEs, access points, base stations (e.g., ng-eNBs, gNBs), etc., via at least one designated RAT (e.g., NR, LTE, GSM, etc.) over a wireless communication medium of interest (e.g., some set of time/frequency resources in a particular frequency spectrum). The WWAN transceivers 310 and 350 may be variously configured for transmitting and encoding signals 318 and 358 (e.g., messages, indications, information, and so on), respectively, and, conversely, for receiving and decoding signals 318 and 358 (e.g., messages, indications, information, pilots, and so on), respectively, in accordance with the designated RAT. Specifically, the WWAN transceivers 310 and 350 include one or more transmitters 314 and 354, respectively, for transmitting and encoding signals 318 and 358, respectively, and one or more receivers 312 and 352, respectively, for receiving and decoding signals 318 and 358, respectively.

The UE 302 and the base station 304 also include, at least in some cases, wireless local area network (WLAN) transceivers 320 and 360, respectively. The WLAN transceivers 320 and 360 may be connected to one or more antennas 326 and 366, respectively, for communicating with other network nodes, such as other UEs, access points, base stations, etc., via at least one designated RAT (e.g., WiFi, LTE-D, Bluetooth®, etc.) over a wireless communication medium of interest. The WLAN transceivers 320 and 360 may be variously configured for transmitting and encoding signals 328 and 368 (e.g., messages, indications, information, and so on), respectively, and, conversely, for receiving and decoding signals 328 and 368 (e.g., messages, indications, information, pilots, and so on), respectively, in accordance with the designated RAT. Specifically, the WLAN transceivers 320 and 360 include one or more transmitters 324 and 364, respectively, for transmitting and encoding signals 328 and 368, respectively, and one or more receivers 322 and 362, respectively, for receiving and decoding signals 328 and 368, respectively.

Transceiver circuitry including at least one transmitter and at least one receiver may comprise an integrated device (e.g., embodied as a transmitter circuit and a receiver circuit of a single communication device) in some implementations, may comprise a separate transmitter device and a separate receiver device in some implementations, or may be embodied in other ways in other implementations. In an aspect, a transmitter may include or be coupled to a plurality of antennas (e.g., antennas 316, 326, 356, 366), such as an antenna array, that permits the respective apparatus to perform transmit "beamforming," as described herein. Similarly, a receiver may include or be coupled to a plurality of antennas (e.g., antennas 316, 326, 356, 366), such as an antenna array, that permits the respective apparatus to perform receive beamforming, as described herein. In an aspect, the transmitter and receiver may share the same plurality of antennas (e.g., antennas 316, 326, 356, 366), such that the respective apparatus can only receive or transmit at a given time, not both at the same time. A wireless communication device of the UE 302 and/or the base station 304 (e.g., one or both of the transceivers 310 and 320 and/or one or both of the transceivers 350 and 360) may also comprise a network listen module (NLM) or the like for performing various measurements.

The UE 302 and the base station 304 also include, at least in some cases, satellite positioning systems (SPS) receivers 330 and 370, respectively. The SPS receivers 330 and 370 may be connected to one or more antennas 336 and 376, respectively, for receiving SPS signals 338 and 378, respectively, such as global positioning system (GPS) signals, global navigation satellite system (GLONASS) signals, Galileo signals, Beidou signals, Indian Regional Navigation Satellite System (NAVIC), Quasi-Zenith Satellite System (QZSS), etc. The SPS receivers 330 and 370 may comprise any suitable hardware and/or software for receiving and processing SPS signals 338 and 378, respectively. The SPS receivers 330 and 370 request information and operations as appropriate from the other systems, and performs calculations necessary to determine positions of the UE 302 and the base station 304 using measurements obtained by any suitable SPS algorithm, respectively.

The base station 304 and the network entity 306 each include at least one network interface 380 and 390, respectively, for communicating with other network entities. For example, the network interfaces 380 and 390 (e.g., one or more network access ports) may be configured to communicate with one or more network entities via a wire-based or wireless backhaul connection. In some aspects, the network interfaces 380 and 390 may be implemented as transceivers configured to support wire-based or wireless signal communication. This communication may involve, for example, sending and receiving messages, parameters, and/or other types of information.

The UE 302, the base station 304, and the network entity 306 also include other components that may be used in conjunction with the operations as disclosed herein. The UE 302 includes processor circuitry implementing a processing system 332 for providing functionality relating to, for example, positioning operations, and for providing other processing functionality. The base station 304 includes a processing system 384 for providing functionality relating to, for example, positioning operations as disclosed herein, and for providing other processing functionality. The network entity 306 includes a processing system 394 for providing functionality relating to, for example, positioning operations as disclosed herein, and for providing other processing functionality. In an aspect, the processing systems 332, 384, and 394 may include, for example, one or more general purpose processors, multi-core processors, ASICs, digital signal processors (DSPs), field programmable gate arrays (FPGA), or other programmable logic devices or processing circuitry.

The UE 302, the base station 304, and the network entity 306 include memory circuitry implementing memory components 340, 386, and 396 (e.g., each including a memory device), respectively, for maintaining information (e.g., information indicative of reserved resources, thresholds, parameters, and so on). In some cases, the UE 302, the base station 304, and the network entity 306 may include positioning components 342, 388, and 398, respectively. The positioning components 342, 388, and 398 may be hardware circuits that are part of or coupled to the processing systems 332, 384, and 394, respectively, that, when executed, cause the UE 302, the base station 304, and the network entity 306 to perform the functionality described herein. In other aspects, the positioning components 342, 388, and 398 may be external to the processing systems 332, 384, and 394 (e.g., part of a modem processing system, integrated with another processing system, etc.), respectively. Alternatively, the positioning components 342, 388, and 398 may be memory modules (as shown in FIGS. 3A-3C) stored in the memory components 340, 386, and 396, respectively, that, when executed by the processing systems 332, 384, and 394 (or a modem processing system, another processing system, etc.), cause the UE 302, the base station 304, and the network entity 306 to perform the functionality described herein.

The UE 302 may include one or more sensors 344 coupled to the processing system 332 to provide movement and/or orientation information that is independent of motion data derived from signals received by the WWAN transceiver 310, the WLAN transceiver 320, and/or the SPS receiver 330. By way of example, the sensor(s) 344 may include an accelerometer (e.g., a micro-electrical mechanical systems (MEMS) device), a gyroscope, a geomagnetic sensor (e.g., a compass), an altimeter (e.g., a barometric pressure altimeter), and/or any other type of movement detection sensor. Moreover, the sensor(s) 344 may include a plurality of different types of devices and combine their outputs in order to provide motion information. For example, the sensor(s) 344 may use a combination of a multi-axis accelerometer and orientation sensors to provide the ability to compute positions in 2D and/or 3D coordinate systems.

In addition, the UE 302 includes a user interface 346 for providing indications (e.g., audible and/or visual indications) to a user and/or for receiving user input (e.g., upon user actuation of a sensing device such a keypad, a touch screen, a microphone, and so on). Although not shown, the base station 304 and the network entity 306 may also include user interfaces.

Referring to the processing system 384 in more detail, in the downlink, IP packets from the network entity 306 may be provided to the processing system 384. The processing system 384 may implement functionality for an RRC layer, a packet data convergence protocol (PDCP) layer, a radio link control (RLC) layer, and a medium access control (MAC) layer. The processing system 384 may provide RRC layer functionality associated with broadcasting of system information (e.g., master information block (MIB), system information blocks (SIBs)), RRC connection control (e.g., RRC connection paging, RRC connection establishment, RRC connection modification, and RRC connection release), inter-RAT mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through automatic repeat request (ARQ), concatenation, segmentation, and reassembly of RLC service data units (SDUs), re-segmentation of RLC data PDUs, and reordering of RLC data PDUs; and MAC layer functionality associated with mapping between logical channels and transport channels, scheduling information reporting, error correction, priority handling, and logical channel prioritization.

The transmitter 354 and the receiver 352 may implement Layer-1 functionality associated with various signal processing functions. Layer-1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The transmitter 354 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an orthogonal frequency division multiplexing (OFDM) subcarrier, multiplexed with a reference signal (e.g., pilot) in the time and/or frequency domain, and then combined together using an inverse fast Fourier transform (IFFT) to produce a physical channel carrying a time domain OFDM symbol stream. The OFDM symbol stream is spatially precoded to produce multiple spatial streams. Channel estimates from a channel estimator may be used to determine the coding and modulation scheme, as well as for spatial processing. The channel estimate may be derived from a reference signal and/or channel condition feedback transmitted by the UE 302. Each spatial stream may then be provided to one or more different antennas 356. The transmitter 354 may modulate an RF carrier with a respective spatial stream for transmission.

At the UE 302, the receiver 312 receives a signal through its respective antenna(s) 316. The receiver 312 recovers information modulated onto an RF carrier and provides the information to the processing system 332. The transmitter 314 and the receiver 312 implement Layer-1 functionality associated with various signal processing functions. The receiver 312 may perform spatial processing on the information to recover any spatial streams destined for the UE 302. If multiple spatial streams are destined for the UE 302, they may be combined by the receiver 312 into a single OFDM symbol stream. The receiver 312 then converts the OFDM symbol stream from the time-domain to the frequency domain using a fast Fourier transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 304. These soft decisions may be based on channel estimates computed by a channel estimator. The soft decisions are then decoded and de-interleaved to recover the data and control signals that were originally transmitted by the base station 304 on the physical channel The data and control signals are then provided to the processing system 332, which implements Layer-3 and Layer-2 functionality.

In the uplink, the processing system 332 provides demultiplexing between transport and logical channels, packet reassembly, deciphering, header decompression, and control signal processing to recover IP packets from the core network. The processing system 332 is also responsible for error detection.

Similar to the functionality described in connection with the downlink transmission by the base station 304, the processing system 332 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through hybrid automatic repeat request (HARQ), priority handling, and logical channel prioritization.

Channel estimates derived by the channel estimator from a reference signal or feedback transmitted by the base station 304 may be used by the transmitter 314 to select the appropriate coding and modulation schemes, and to facilitate spatial processing. The spatial streams generated by the transmitter 314 may be provided to different antenna(s) 316. The transmitter 314 may modulate an RF carrier with a respective spatial stream for transmission.

The uplink transmission is processed at the base station 304 in a manner similar to that described in connection with the receiver function at the UE 302. The receiver 352 receives a signal through its respective antenna(s) 356. The receiver 352 recovers information modulated onto an RF carrier and provides the information to the processing system 384.

In the uplink, the processing system 384 provides demultiplexing between transport and logical channels, packet reassembly, deciphering, header decompression, control signal processing to recover IP packets from the UE 302. IP packets from the processing system 384 may be provided to the core network. The processing system 384 is also responsible for error detection.

For convenience, the UE 302, the base station 304, and/or the network entity 306 are shown in FIGS. 3A-3C as including various components that may be configured according to the various examples described herein. It will be appreciated, however, that the illustrated blocks may have different functionality in different designs.

The various components of the UE 302, the base station 304, and the network entity 306 may communicate with each other over data buses 334, 382, and 392, respectively. The components of FIGS. 3A-3C may be implemented in various ways. In some implementations, the components of FIGS. 3A-3C may be implemented in one or more circuits such as, for example, one or more processors and/or one or more ASICs (which may include one or more processors). Here, each circuit may use and/or incorporate at least one memory component for storing information or executable code used by the circuit to provide this functionality. For example, some or all of the functionality represented by blocks 310 to 346 may be implemented by processor and memory component(s) of the UE 302 (e.g., by execution of appropriate code and/or by appropriate configuration of processor components). Similarly, some or all of the functionality represented by blocks 350 to 388 may be implemented by processor and memory component(s) of the base station 304 (e.g., by execution of appropriate code and/or by appropriate configuration of processor components). Also, some or all of the functionality represented by blocks 390 to 398 may be implemented by processor and memory component(s) of the network entity 306 (e.g., by execution of appropriate code and/or by appropriate configuration of processor components). For simplicity, various operations, acts, and/or functions are described herein as being performed "by a UE," "by a base station," "by a positioning entity," etc. However, as will be appreciated, such operations, acts, and/or functions may actually be performed by specific components or combinations of components of the UE, base station, positioning entity, etc., such as the processing systems 332, 384, 394, the transceivers 310, 320, 350, and 360, the memory components 340, 386, and 396, the positioning components 342, 388, and 398, etc.

Figure 4:
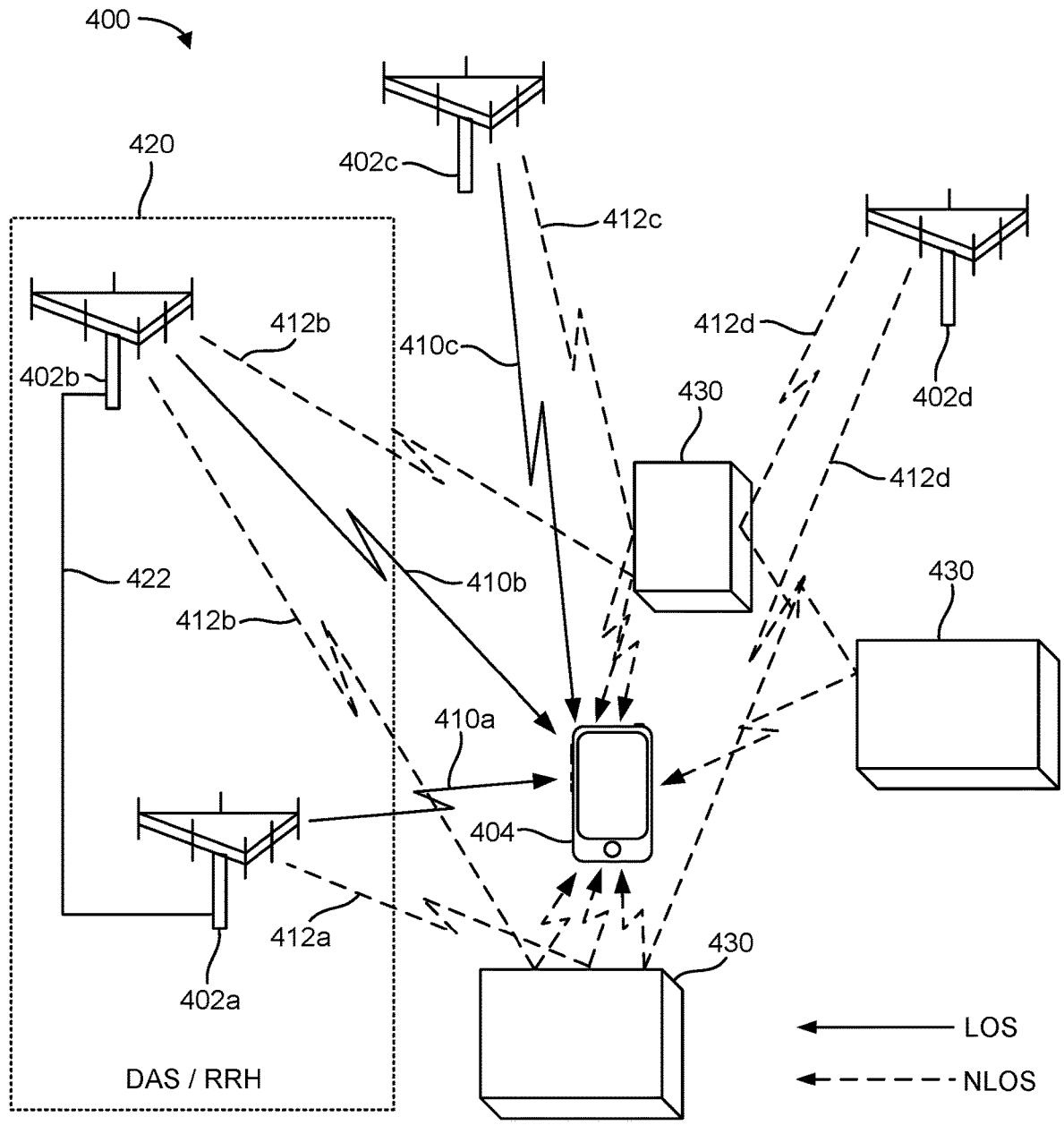
FIG. 4 illustrates an exemplary wireless communications system, according to aspects of the disclosure.

FIG. 4 illustrates an exemplary wireless communications system 400, according to aspects of the disclosure. In the example of FIG. 4, a UE 404, which may correspond to any of the UEs described herein, is attempting to calculate or otherwise estimate its location, or assist another entity (e.g., a base station or core network component, another UE, a location server, a third party application, etc.) to calculate or otherwise estimate its location. The UE 404 may communicate wirelessly with a plurality of base stations 402a-402d (collectively, base stations 402), which may correspond to any combination of base stations described herein, using RF signals and standardized protocols for the modulation of the RF signals and the exchange of information packets. Note that while FIG. 4 illustrates one UE 404 and four base stations 402, as will be appreciated, there may be more UEs 404 and more or fewer base stations 402.

FIG. 4 further illustrates an aspect in which base stations 402a and 402b form a DAS/RRH 420. For example, the base station 402a may be the serving base station of the UE 404 and the base station 402b may be a neighbor base station of the UE 404. As such, the base station 402b may be the RRH of the base station 402a. The base stations 402a and 402b may communicate with each other over a wired or wireless link 422.

The unique challenges of heavy path-loss in mmW communication systems necessitates new techniques, such as hybrid beamforming (joint digital and analog beamforming) that are not present in 3G and/or 4G wireless communication systems. Accordingly, there is a need to enhance the positioning methods that are traditionally used in wireless networks to take into account the unique challenges that may arise with beamformed communication.

In NR, it is expected that the location accuracy requirements will be higher. For regulatory cases, the following may be considered as minimum performance targets for positioning in NR:

Horizontal positioning error≤50 m for 80% of UEs;
Vertical positioning error≤5 m for 80% of UEs; and
End to end latency and time to first fix (TTFF)<30 s.

For commercial use cases, the requirements may be even more stringent. As a starting point, the following requirements may be considered as performance targets in NR:

Horizontal positioning error<3 m for 80% of UEs in indoor deployment scenarios;
Vertical positioning error<3 m for 80% of UEs in indoor deployment scenarios;
Horizontal positioning error<10 m for 80% of UEs in outdoor deployment scenarios;
Vertical positioning error<10 m for 80% of UEs in outdoor deployment scenarios; and
End to end latency<1 s.

NR supports a number of cellular network-based positioning technologies, including downlink-based, uplink-based, and downlink-and-uplink-based positioning methods. Downlink-based positioning methods include observed time difference of arrival (OTDOA) in LTE, downlink time difference of arrival (DL-TDOA) in NR, and downlink angle-of-departure (DL-AoD) in NR. In an OTDOA or DL-TDOA positioning procedure, a UE measures the differences between the times of arrival (ToAs) of reference signals (e.g., positioning reference signals (PRS), tracking reference signals (TRS), cell-specific reference signals (CRS), channel state information reference signals (CSI-RS), SSBs, etc.) received from pairs of base stations, referred to as reference signal time difference (RSTD) or time difference of arrival (TDOA) measurements, and reports them to a positioning entity. More specifically, the UE receives the identifiers of a reference base station (e.g., a serving base station) and multiple non-reference base stations in assistance data. The UE then measures the RSTD between the reference base station and each of the non-reference base stations. Based on the known locations of the involved base stations and the RSTD measurements, the positioning entity can estimate the UE's location. For DL-AoD positioning, a base station measures the angle and other channel properties (e.g., signal strength) of the downlink transmit beam used to communicate with a UE to estimate the location of the UE.

Uplink-based positioning methods include uplink time difference of arrival (UL-TDOA) and uplink angle-of-arrival (UL-AoA). UL-TDOA is similar to DL-TDOA, but is based on uplink reference signals (e.g., SRS) transmitted by the UE. For UL-AoA positioning, a base station measures the angle and other channel properties (e.g., gain level) of the uplink receive beam used to communicate with a UE to estimate the location of the UE.

Downlink-and-uplink-based positioning methods include enhanced cell-ID (E-CID) positioning and multi-round-trip-time (RTT) positioning (also referred to as "multi-cell RTT"). In an RTT procedure, an initiator (a base station or a UE) transmits an RTT measurement signal (e.g., a PRS or SRS) to a responder (a UE or base station), which transmits an RTT response signal (e.g., an SRS or PRS) back to the initiator. The RTT response signal includes the difference between the ToA of the RTT measurement signal and the transmission time of the RTT response signal, referred to as the reception-to-transmission (Rx-Tx) measurement. The initiator calculates the difference between the transmission time of the RTT measurement signal and the ToA of the RTT response signal, referred to as the "Tx-Rx" measurement. The propagation time (also referred to as the "time of flight") between the initiator and the responder can be calculated from the Tx-Rx and Rx-Tx measurements. Based on the propagation time and the known speed of light, the distance between the initiator and the responder can be determined. For multi-RTT positioning, a UE performs an RTT procedure with multiple base stations to enable its location to be triangulated based on the known locations of the base stations. RTT and multi-RTT methods can be combined with other positioning techniques, such as UL-AoA and DL-AoD, to improve location accuracy.

The E-CID positioning method is based on radio resource management (RRM) measurements. In E-CID, the UE reports the serving cell identifier (ID), the timing advance (TA), and the identifiers, estimated timing, and signal strength of detected neighbor base stations. The location of the UE is then estimated based on this information and the known locations of the base stations.

To support the various positioning methods described above, the base stations 402 may be configured to broadcast reference signals (e.g., PRS, CRS, CSI-RS, TRS, SSBs, etc.) on one or more downlink transmit beams to UEs 404 in their coverage area to enable a UE 404 to measure reference signal timing characteristics (e.g., ToA) to identify the beam that best excites the line-of-sight (LOS), or the shortest non-line-of-sight (NLOS), radio path between the UE 404 and the transmitting base station(s) 402. Identifying the LOS/shortest NLOS path is of interest not only because these beams can subsequently be used for positioning purposes, but also because identifying these beams can directly provide some positioning information based on the beam direction.

Note that the terms "positioning reference signal" and "PRS" may sometimes refer to specific reference signals that are used for positioning in LTE systems. However, as used herein, unless otherwise indicated, the terms "positioning reference signal" and "PRS" refer to any type of reference signal that can be used for positioning, such as but not limited to, PRS, TRS, CSI-RS, etc.

To assist positioning operations, a location server (e.g., location server 230, LMF 270, SLP 272) may provide assistance data to the UE 404. For example, the assistance data may include identifiers of the base stations 402 (or the cells/TRPs of the base stations 402) from which to measure reference signals, the reference signal configuration parameters (e.g., the number of consecutive positioning subframes, periodicity of positioning subframes, muting sequence, frequency hopping sequence, reference signal identifier (ID), reference signal bandwidth, etc.), and/or other parameters applicable to the particular positioning method. Alternatively, the assistance data may originate directly from the base stations 402 themselves (e.g., in periodically broadcasted overhead messages, etc.). In some cases, the UE 404 may be able to detect neighbor network nodes itself without the use of assistance data.

To accurately estimate the location of the UE 404 using reference signals received from a base station 402, the UE 404 may measure the reference signals received over the LOS path (or the shortest NLOS path where an LOS path is not available) between the UE 404 and a network node (e.g., base station 402, an antenna or antenna array of a base station 402). However, RF signals travel not only by the LOS/shortest path between a transmitter and a receiver, but also over a number of other paths as the RF signals spread out from the transmitter and reflect off other objects such as hills, buildings, water, and the like on their way to the receiver. Thus, FIG. 4 illustrates a number of LOS paths 410a-410c (collectively, LOS paths 410) and a number of NLOS paths 412a-412d (collectively, NLOS paths 412) between the base stations 402 and the UE 404. Specifically, FIG. 4 illustrates base station 402a transmitting over an LOS path 410a and an NLOS path 412a, base station 402b transmitting over an LOS path 410b and two NLOS paths 412b, base station 402c transmitting over an LOS path 410c and an NLOS path 412c, and base station 402d transmitting over two NLOS paths 412d. As illustrated in FIG. 4, each NLOS path 412 reflects off some object 430 (e.g., a building). As will be appreciated, each LOS path 410 and NLOS path 412 transmitted by a base station 402 may be transmitted by different antennas/antenna arrays of the base station 402 (e.g., as in a MIMO system), or may be transmitted by the same antenna/antenna array of a base station 402 (thereby illustrating the propagation of an RF signal). Note that as used herein, the term "LOS path" refers to the shortest path between a transmitter and a receiver, and may not be an actual LOS path, but rather, the shortest NLOS path.

In an aspect, one or more of base stations 402 may be configured to use beamforming to transmit RF signals. In that case, some of the available beams may focus the transmitted RF signal along the LOS path(s) 410 (e.g., the beams that produce the highest antenna gain along the LOS path(s)) while other available beams may focus the transmitted RF signal along NLOS paths 412. A beam that has high gain along a certain path and thus focuses the RF signal along that path may still have some RF signal propagation along other paths; the strength of that RF signal naturally depends on the beam gain along those other paths.

Where a base station 402 uses beamforming to transmit RF signals, the beams of interest for data communication between the base station 402 and the UE 404 will be the beams carrying RF signals that arrive at UE 404 with the highest signal strength (as indicated by, for example, the RSRP, RSRQ, SINR), whereas the beams of interest for location estimation will be the beams carrying RF signals that excite the LOS path (e.g., an LOS path 410). In some frequency bands (e.g., FR1), these will be the same beams. However, in other frequency bands, such as mmW, where a large number of antenna elements can be used to create narrow transmit beams, they may not be the same beams. As described below with reference to FIG. 5, in some cases, the signal strength of RF signals on the LOS path 410 may be weaker (e.g., due to obstructions) than the signal strength of RF signals on an NLOS path 412, over which the RF signals arrive later due to propagation delay.

The term "location estimate" may refer to an estimate of a location for a UE 404, which may be geographic (e.g., may comprise a latitude, longitude, and possibly altitude) or civic (e.g., may comprise a street address, building designation, or precise point or area within or nearby to a building or street address, such as a particular entrance to a building, a particular room or suite in a building, or a landmark such as a town square). A location estimate may also be referred to as a "location," a "position," a "fix," a "position fix," a "location fix," a "location estimate," a "fix estimate," or some other term. The means of obtaining a location estimate may be referred to generically as "positioning," "locating," "position fixing," or the like. A particular solution for obtaining a location estimate may be referred to as a "location solution" or the like. A particular method for obtaining a location estimate as part of a location solution may be referred to as a "position method", a "positioning method," or the like.

As used herein, a "network node" may refer to a base station 402, a cell of a base station 402, a TRP of a base station, a remote radio head, an antenna of a base station 402 (where the locations of the antennas of a base station 402 are distinct from the location of the base station 402 itself), or any other network entity capable of transmitting reference signals. Further, as used herein, a "node" may refer to either a network node or a UE.

Figure 5:
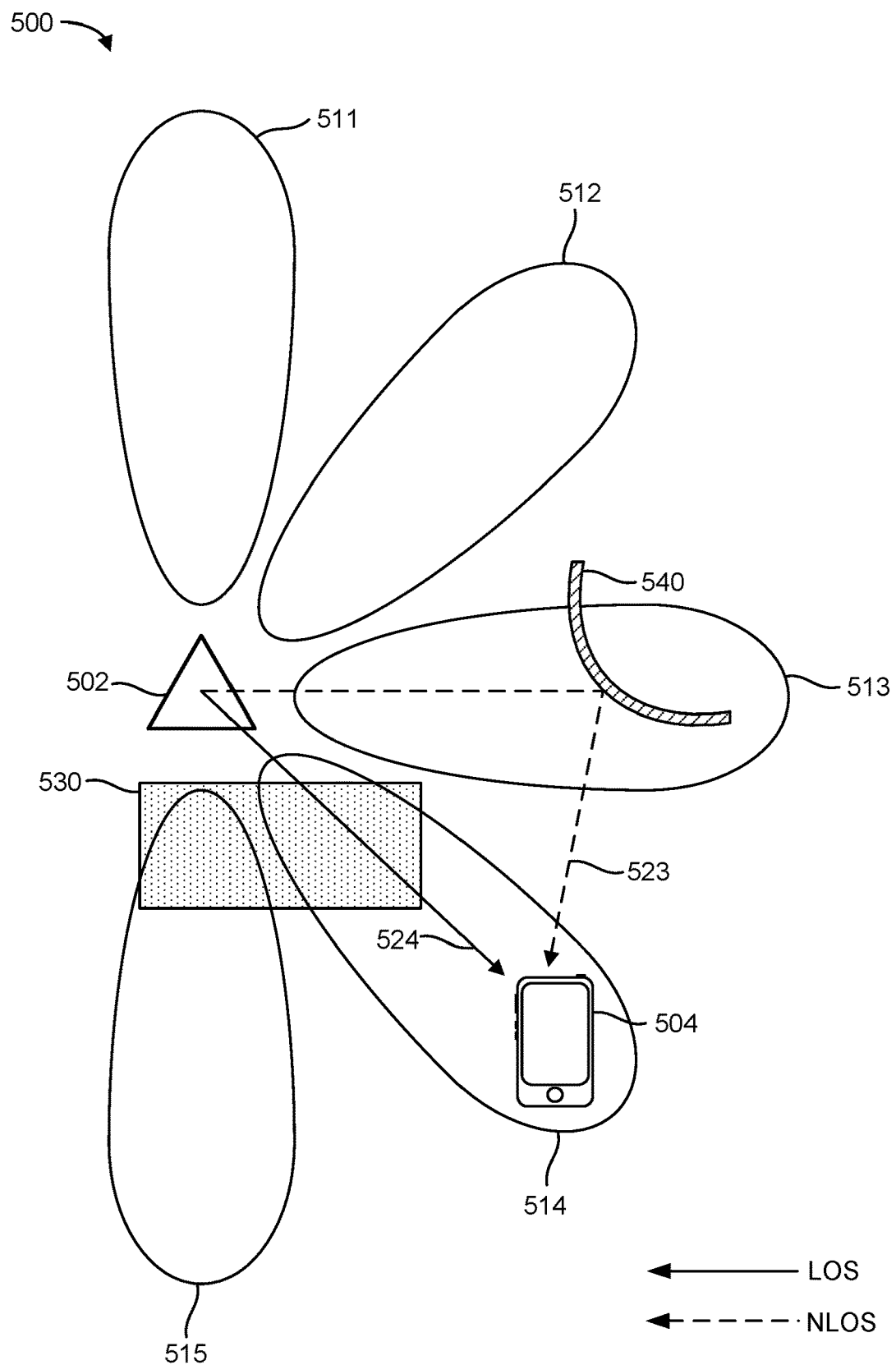
FIG. 5 illustrates an exemplary wireless communications system, according to aspects of the disclosure.

FIG. 5 illustrates an exemplary wireless communications system 500 according to aspects of the disclosure. The UE 504 may communicate wirelessly with a base station 502, which may correspond to any of the base stations described herein, using RF signals and standardized protocols for the modulation of the RF signals and the exchange of information packets.

As illustrated in FIG. 5, the base station 502 may be utilizing beamforming to transmit a plurality of beams 511-515 of RF signals. Each beam 511-515 may be formed and transmitted by an array of antennas (e.g., a TRP) of the base station 502. Although FIG. 5 illustrates a base station 502 transmitting five beams, as will be appreciated, there may be more or fewer than five beams, and beam shapes, such as peak gain, width, and side-lobe gains, may differ amongst the transmitted beams.

A beam index may be assigned to each of the plurality of beams 511-515 for purposes of distinguishing RF signals associated with one beam from RF signals associated with another beam. Moreover, the RF signals associated with a particular beam of the plurality of beams 511-515 may carry a beam index indicator. A beam index may also be derived from the time of transmission (e.g., frame, slot, and/or OFDM symbol number) of the RF signal. The beam index indicator may be, for example, a three-bit field for uniquely distinguishing up to eight beams. If two different RF signals having different beam indices are received, this would indicate that the RF signals were transmitted using different beams. If two different RF signals share a common beam index, this would indicate that the different RF signals were transmitted using the same beam. Another way to describe that two RF signals are transmitted using the same beam is to say that the antenna port(s) used for the transmission of the first RF signal are spatially quasi-collocated with the antenna port(s) used for the transmission of the second RF signal.

In the example of FIG. 5, the UE 504 may receive an NLOS data stream 523 of RF signals transmitted on beam 513 and an LOS data stream 524 of RF signals transmitted on beam 514. Although FIG. 5 illustrates the NLOS data stream 523 and the LOS data stream 524 as single lines (dashed and solid, respectively), as will be appreciated, the NLOS data stream 523 and the LOS data stream 524 may each comprise multiple rays (i.e., "clusters") by the time they reach the UE 504 due, for example, to the propagation characteristics of RF signals through multipath channels. For example, a cluster of RF signals may be formed when an electromagnetic wave is reflected off of multiple surfaces of an object, and reflections arrive at the receiver (e.g., UE 504) from roughly the same angle, each travelling a few wavelengths (e.g., centimeters) more or less than others. A "cluster" of received RF signals generally corresponds to a single transmitted RF signal.

In the example of FIG. 5, the NLOS data stream 523 is not originally directed at the UE 504, although, as will be appreciated, it could be, as are the RF signals on the NLOS paths 412 in FIG. 4. However, it reflects off a reflector 540 (e.g., a building) and reaches the UE 504 without obstruction, and therefore, may still be a relatively strong RF signal. In contrast, the LOS data stream 524 is directed at the UE 504 but passes through an obstruction 530 (e.g., vegetation, a building, a hill, a disruptive environment such as clouds or smoke, etc.) that may significantly degrade the RF signal. As will be appreciated, although the LOS data stream 524 is weaker than the NLOS data stream 523, the LOS data stream 524 will arrive at the UE 504 before the NLOS data stream 523 because it follows a shorter path from the base station 502 to the UE 504.

As noted above, the beam of interest for data communication between a base station (e.g., base station 502) and a UE (e.g., UE 504) is the beam carrying RF signals that arrives at the UE with the highest signal strength (e.g., highest RSRP, RSRQ, SINR), whereas the beam of interest for location estimation is the beam carrying RF signals that excite the LOS path and that has the highest gain along the LOS path amongst all other beams (e.g., beam 514). That is, even if beam 513 (the NLOS beam) were to weakly excite the LOS path (due to the propagation characteristics of RF signals, even though not being focused along the LOS path), that weak signal, if any, of the LOS path of beam 513 may not be as reliably detectable (compared to that from beam 514), thus leading to greater error in performing a positioning measurement.

While the beam of interest for data communication and the beam of interest for location estimation may be the same beams for some frequency bands (e.g., in FR1), for other frequency bands, such as mmW, they may not be the same beams. As such, referring to FIG. 5, where the UE 504 is engaged in a data communication session with the base station 502 (e.g., where the base station 502 is the serving base station for the UE 504) and not simply attempting to measure reference signals transmitted by the base station 502, the beam of interest for the data communication session may be beam 513, as it is carrying the unobstructed NLOS data stream 523. The beam of interest for location estimation, however, would be beam 514, as it carries the strongest LOS data stream 524, despite being obstructed.

Figure 6A:
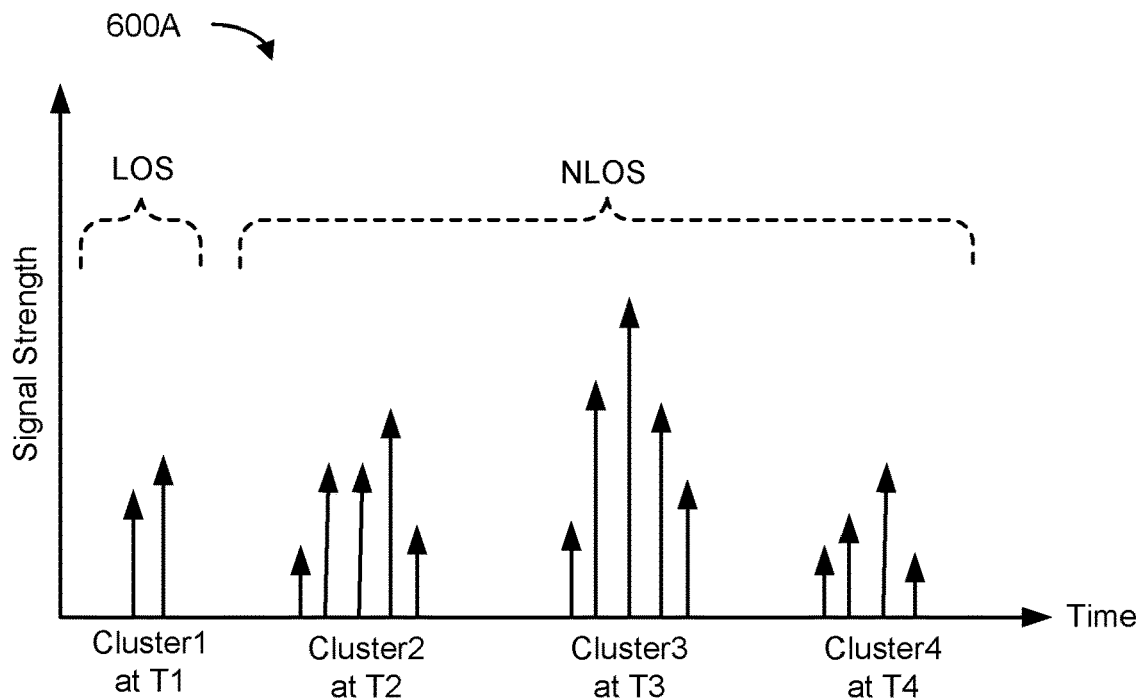
FIG. 6A is a graph showing a radio frequency (RF) channel response at a UE over time, according to aspects of the disclosure.

FIG. 6A is a graph 600A showing an RF channel response at a receiver (e.g., any of the UEs described herein) over time, according to aspects of the disclosure. Under the channel illustrated in FIG. 6A, the receiver receives a first cluster of two RF signals on channel taps at time T1, a second cluster of five RF signals on channel taps at time T2, a third cluster of five RF signals on channel taps at time T3, and a fourth cluster of four RF signals on channel taps at time T4. In the example of FIG. 6A, because the first cluster of RF signals at time T1 arrives first, it is presumed to be the LOS data stream (i.e., the data stream arriving over the LOS or the shortest path), and may correspond to the LOS data stream 524. The third cluster at time T3 is comprised of the strongest RF signals, and may correspond to the NLOS data stream 523. Seen from the transmitter's side, each cluster of received RF signals may comprise the portion of an RF signal transmitted at a different angle, and thus each cluster may be said to have a different AoD from the transmitter.

Note that although FIG. 6A illustrates clusters of two to five channel taps, as will be appreciated, the clusters may have more or fewer than the illustrated number of channel taps.

Figure 6B:
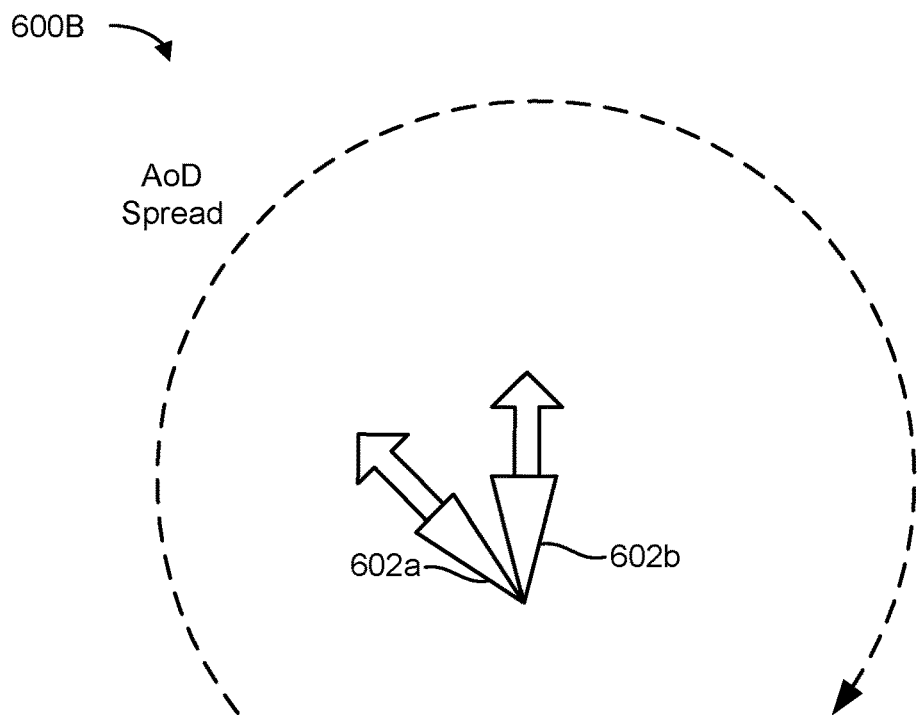
FIG. 6B illustrates an exemplary separation of clusters in angle of departure (AoD), according to aspects of the disclosure.

FIG. 6B is a diagram 600B illustrating this separation of clusters in AoD, according to aspects of the disclosure. The RF signal transmitted in AoD range 602a may correspond to one cluster (e.g., "Cluster1") in FIG. 6A, and the RF signal transmitted in AoD range 602b may correspond to a different cluster (e.g., "Cluster3") in FIG. 6A. Note that although AoD ranges of the two clusters depicted in FIG. 6B are spatially separated, AoD ranges of some clusters may also partially overlap even though the clusters are separated in time. For example, this may arise when two separate buildings at the same AoD from the transmitter reflect the RF signal towards the receiver.

As in the example of FIG. 5, the transmitter (e.g., a base station) may utilize beamforming to transmit a plurality of beams of RF signals such that one of the beams (e.g., beam 514) is directed at the AoD range 602a of the first cluster of RF signals, and a different beam (e.g., beam 513) is directed at the AoD range 602b of the third cluster of RF signals. The signal strength of clusters in post-beamforming channel response (i.e., the channel response when the transmitted RF signal is beamformed instead of omni-directional) will be scaled by the beam gain along the AoD of the clusters. In that case, the beam of interest for positioning would be the beam directed at the AoD of the first cluster of RF signals, as they arrive first, and the beam of interest for data communications may be the beam directed at the AoD of the third cluster of RF signals, as they are the strongest.

In general, when transmitting an RF signal, the transmitter (e.g., a base station) does not know the path the transmitted RF signal will follow to the receiver (e.g., a UE) or when the transmitted RF signal will arrive at the receiver. Therefore, the transmitter may transmit the RF signal on different antenna ports with an equal amount of energy. Alternatively, the transmitter may beamform the RF signal in different directions over multiple transmission occasions and obtain measurement feedback from the receiver to explicitly or implicitly determine radio paths.

Note that although the techniques disclosed herein have generally been described in terms of transmissions from a base station to a UE, as will be appreciated, they are equally applicable to transmissions from a UE to a base station where the UE is capable of MIMO operation and/or beamforming. Also, while beamforming is generally described above in context with transmit (TX) beamforming, receive (RX) beamforming may also be used in conjunction with TX beamforming in certain aspects.

To assist a UE to perform RX beamforming for positioning purposes, an option is for the UE to use a fixed RX beam to receive downlink PRS resources (collections of resource elements that are used for transmission of PRS) that are transmitted with different downlink spatial domain transmission filters. That is, the UE may use the same RX beam to detect downlink RF signals transmitted from a base station (e.g., a gNB) to support timing-based positioning (e.g., DL-TDOA, RTT, multi-cell RTT, E-CID) and/or angle-based positioning (e.g., DL-AoD, DL-AoA).

Also for positioning purposes, for uplink beam management/alignment towards serving and neighboring cells/TRPs, an option is for the UE to use a fixed TX beam for uplink SRS transmissions across multiple uplink SRS resources (collections of resource elements that are used for transmission of SRS) for both FR1 and FR2. That is, the UE may use the same TX beam to transmit uplink RF signals to a base station to support timing-based positioning (e.g., UL-TDOA, RTT, multi-cell RTT, E-CID) and/or angle-based positioning (e.g., UL-AoD, UL-AoA).

In a test scenario (i.e., where a UE is being tested), the network may configure a UE to implement a beam lock function in which the UE uses the same TX beam (when transmitting) and the same RX beam (when receiving), which can significantly simplify test methods required for off-axis stimulus and measurements. However, during normal operations, the UE is expected to form a TX beam and/or a RX beam towards the base station, which may result in changing the beam(s). For example, the UE may be moving and thus its orientation to the base station may change. Alternatively, or in addition thereto, the spatial properties of a channel between the UE and the base station may fluctuate. UEs may also change beams as a normal part of their automatic gain control (AGC) processes, even along the same direction. This is because, at least in part, different AGCs can have different effects on phases of the received signal.

Figure 7A:
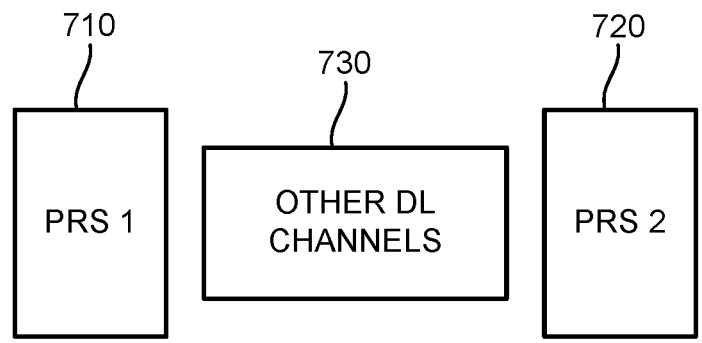
FIG. 7A illustrates an exemplary circumstance in which a UE is configured with multiple receive resources for beam lock support, according to aspects of the disclosure.
Figure 7B:
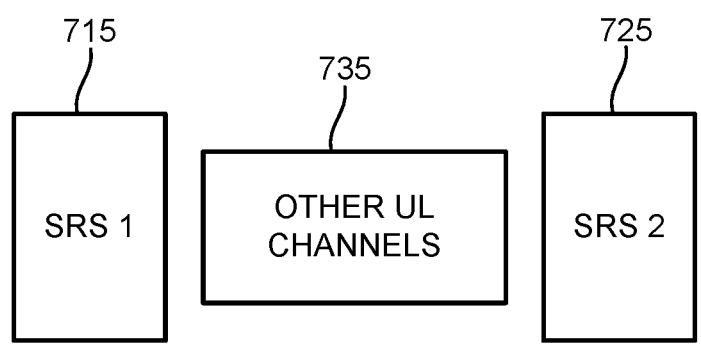
FIG. 7B illustrates an exemplary circumstance in which a UE is configured with multiple transmit resources for beam lock support, according to aspects of the disclosure.

In some situations, such as when estimating the location of the UE, it may be advantageous for the UE to be in a beam lock mode, whether for transmitting and/or receiving reference signals. However, during a normal operation, it may or may not be possible for the UE to be in a beam lock mode. For example, FIGS. 7A and 7B illustrate exemplary scenarios in which a UE is configured with multiple receive resources and transmit resources, respectively, for beam lock support. In FIG. 7A, the UE is configured with two PRS resources ("PRS 1" 710 and "PRS 2" 720) and other downlink channels 730. In FIG. 7B, the UE is configured with two SRS resources ("SRS 1" 715 and "SRS 2" 725) and other uplink channels 735. In the examples of FIGS. 7A and 7B, a network entity (e.g., a location server, serving base station, etc.) may request the UE to:

Perform RSRP measurements;
Use the same RX or TX beam;
Use the same spatial QCL with strict beam locked reception; and/or
Both receive PRS and transmit SRS in a beam lock mode.

An issue is that it may be difficult for the UE to receive/transmit using the same RX/TX beam under various scenarios, including:

The two PRS/SRS resources are not contiguous in time (e.g., some number of symbols, slots, frames, etc. apart), and the UE transmits/receives other signals in between the two PRS/SRS resources;
The two SRS resources are contiguous in time, but they have a different power control or timing advance;
The two PRS resources are contiguous in time, but are quasi-collocated (spatially and/or temporally) with a different reference signals, resulting in potentially different AGC settings between them;
The PRS/SRS is also used for other purposes, referred to as a "dual-use" reference signal, in which case, it may interfere with normal/legacy operation of the UE;
Activation or deactivation of the TX/RX beam lock mode with a MAC control element (MAC-CE) or based on downlink control information (DCI); and
The two PRS/SRS resources are in different bands.

Figure 8A:
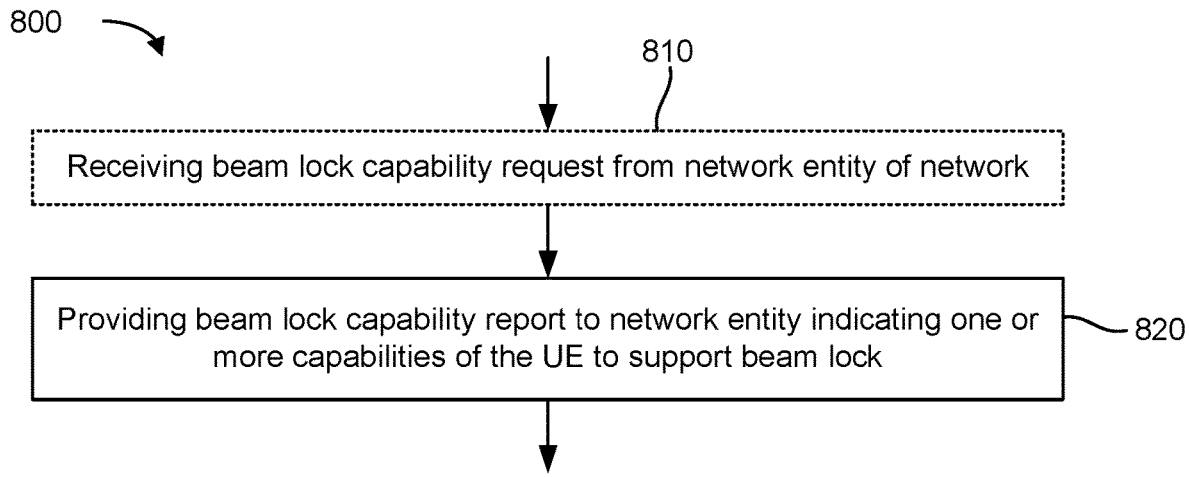
FIGS. 8A and 8B are flow charts of exemplary methods performed by a UE for supporting beam lock, according to aspects of the disclosure.
Figure 8B:
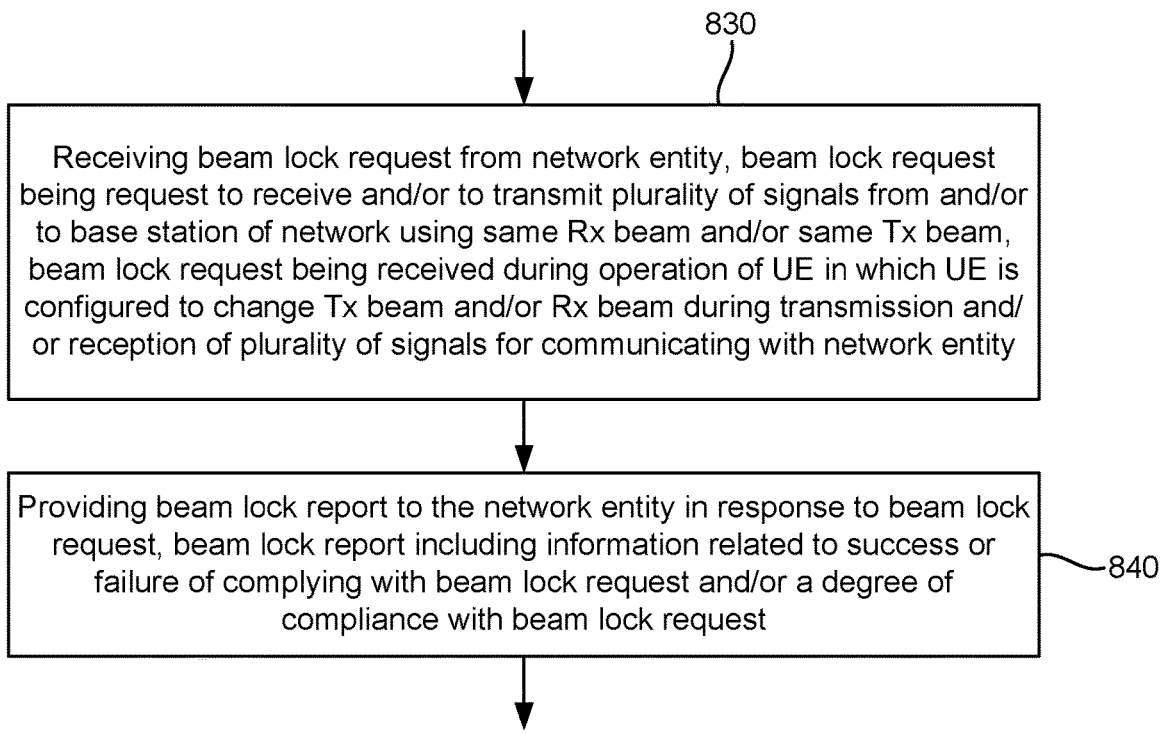

To address these issues, in an aspect, a network entity (e.g., a gNB, a location server, etc.) may transmit a beam lock request to the UE, and the UE may respond with a report related to the beam lock request. FIGS. 8A and 8B illustrate flow charts of an exemplary method 800 performed by a user equipment (UE) configured to support beam lock. The method 800 is separated into two flow charts to indicate that the processes of the illustrated flow charts, while related, need not take place contemporaneously. In an aspect, the method 800 may be performed by WWAN transceiver 310, processing system 332, memory component 340, and/or positioning component 342, any or all of which may be considered means for performing the operations of method 800.

FIG. 8A illustrates a flow chart of the UE informing the network of its beam lock capabilities. In block 820, the UE provides a beam lock capability report to a network entity (e.g., a location server, a base station, etc.). The beam lock capability report may indicate one or more capabilities of the UE to support a beam lock. In an aspect, the UE may provide the beam lock capability report on its own initiative (e.g., when the UE first connects to the network after power on). Alternatively, the UE may provide the beam lock capability report in response to receiving a beam lock capability request from the network entity in block 810. Block 810 is represented in a dashed rectangle to indicate that it is optional. Details regarding the beam lock capability report will be described further below.

FIG. 8B illustrates a flow chart of the UE performing a beam lock. In block 830, the UE receives a beam lock request from a network entity. The network entity may be a base station (e.g., a gNB) or a network server (e.g., location server 230, LMF 270, SLP 272) making the request through the base station. Generally, the beam lock request may be viewed as a request for the UE to receive a plurality of signals from the base station using the same RX beam, and/or as a request for the UE to transmit a plurality of signals to the base station using the same TX beam.

The beam lock request may be received during a normal operation of the UE. In an aspect, the normal operation of the UE may be defined as an operation mode in which the UE is configured to change the TX beam and/or the RX beam during transmission and/or reception of the plurality of signals when communicating with the network entity. For example, the UE may be moving such that the channel conditions of a current beam are deteriorating rapidly. In this instance, the UE and/or the network entity may determine that a beam change is necessary to maintain the UE's communication with the network. During normal operation, the UE may prioritize connectivity with the network over complying with the beam lock request. In an aspect, if the UE determines that it can maintain communication with the network while complying with the beam lock request at least partially, the UE may partially comply with the beam lock request.

The beam lock request may be in a downlink direction (also referred to as a receive beam lock request), which in this context may be viewed as a request for the UE to use the same RX beam in receiving a plurality of downlink signals from the base station (e.g., a gNB). Alternatively, or in addition thereto, the beam lock request may be in an uplink direction (also referred to as a transmit beam lock request), which in this context may be viewed as a request for the UE to use the same TX beam when transmitting a plurality of uplink signals to the base station.

As will be discussed further below, the beam lock request may be implicit or explicit. The beam lock request may be received in DCI and/or in a MAC-CE from the base station.

In block 840, the UE provides a beam lock report to the network entity in response to the beam lock request. The beam lock report may include information related to success or failure of the UE in complying with the beam lock request. For example, this may be a simple acknowledgment (ACK) or negative acknowledgment (NACK).

Alternatively, or in addition thereto, the beam lock report may include information related to a degree of compliance with the beam lock request, for example, when the UE partially complies. In an aspect, the beam lock report may be provided together with other report(s) provided to the network entity. That is, the beam lock report and the other report(s) may be provided separately but contemporaneously to the network entity. Alternatively, the beam lock report may be provided together with the other report(s) by incorporating the beam lock report into the other report(s).

For example, consider the following scenarios: (1) the plurality of signals are a plurality of downlink signals including at least first and second downlink reference signals (DL RS), such as first and second PRS; (2) the beam lock request is a receive beam lock request requesting that at least the first and second DL RSs be received using the same RX beam; and (3) the beam lock request is associated with a measurement request received from the network entity to measure the first and second DL RS at the UE. In this instance, the beam lock report may be provided to the network entity together with the measurement report.

In an aspect, the beam lock request may explicitly request that the UE receive the first and second DL RS using the same RX beam. In another aspect, the beam lock request may be implicitly assumed when there is an indication that the measurement request is for positioning purposes. In other words, when the measurement request is made for positioning purposes, the measurement request itself may implicitly serve as a beam lock request.

The measurement report may include reports on any one or more of received signal powers (e.g., RSRP), time-based measurements (e.g., ToA, RSTD, etc.), and angle-based measurements (e.g., AoA, such as azimuth angle and/or zenith angle) of the first and second downlink signals.

As discussed above, in block 820, the UE may provide the beam lock capability to the network. In an aspect, the beam lock capability report may comprise an RSRP tolerance due to changes in two RX beams between two received resources (e.g., between two resources carrying two DL RS, respectively). The RSRP tolerance may define a cutoff (e.g., in dB) in which the two RX beams are considered to be the same or different RX beams. For example, if the RSRP tolerance is set at 3 dB and the measurement report indicates that the RSRPs of the first and second DL RS differ by less (or more) than 3 dB, the UE and/or the network entity may determine that the two RX beams are the same (or different). That is, the UE and/or the network entity may determine that the beam lock may (or may not) be supported for the first and second DL RS.

Alternatively, or in addition thereto, the beam lock capability report may also comprise one or more angle tolerances (e.g., azimuth angle tolerance and/or zenith angle tolerance) due to changes in two RX beams between two received resources. The one or more angle tolerances may define a cutoff (e.g., in angle) in which the two RX beams are considered to be the same or different RX beams. For example, if the angle tolerance is set at 5° and the measurement report indicates that the AoAs of the first and second DL RS differ by less (or more) than 5°, the UE and/or the network entity may determine that the two RX beams are the same (or different). That is, the UE and/or the network entity may determine that the beam lock is (or is not) supported for the first and second DL RS. There may also be tolerances for the time-based measurements.

In an aspect, the beam lock report in block 840 may include any changes in the RX beams used to receive the plurality of downlink signals. As an example, assume that first and second RX beams are used to respectively receive the first and second DL RS. In this instance, the beam lock report may include whether there are any changes between the first and second RX beams, and if so, how much change. For example, the beam lock report may include changes in RSRPs and/or changes in angles (azimuth and/or zenith). Alternatively, or in addition thereto, the beam lock report may include any changes in settings between the first and second RX beams in receiving the first and second signals. For example, the beam lock report may include changes in RX AGC settings between the first and second RX beams.

Based on the changes, the UE and/or the network entity may determine whether the first and second RX beams are the same or different (i.e., determine whether the beam lock is supported). That is, the UE and/or the network entity may determine that the beam lock is (or is not) supported for the first and second DL RS.

In an aspect, the beam lock report may be provided together with another report provided to the network entity when the beam lock request is a transmit beam lock request. For example, consider the following scenarios: (1) the plurality of signals are a plurality of uplink signals including at least first and second uplink reference signals (UL RS), such as first and second SRS; (2) the beam lock request is a transmit beam lock request requesting that at least the first and second UL RSs be transmitted using the same TX beam; and (3) the beam lock request is associated with a transmission request received from the network entity to transmit the first and second UL RSs from the UE. In this instance, the beam lock report may be provided to the network entity contemporaneously with transmitting the first and second UL RSs.

In an aspect, the beam lock request may explicitly request that the UE transmit the first and second UL RSs. In another aspect, the beam lock request may be implicitly assumed when there is an indication that the transmission request is for positioning purposes. In other words, when the transmission request is made for positioning purposes, the transmission request itself may implicitly serve as a beam lock request.

As discussed above, in block 820, the UE may provide the beam lock capability to the network. In an aspect, the beam lock capability report may comprise a TX power tolerance due to changes in two TX beams between two transmit resources (e.g., between two resources carrying two UL RS, respectively). The TX power tolerance may define a cutoff (e.g., in dB) in which the two TX beams are considered to be the same or different TX beams. For example, if the TX power tolerance is set at 3 dB and the TX power of the first and second UL RSs is less (or more) than 3 dB, the UE and/or the network entity may determine that the two TX beams are the same (or different). That is, the UE and/or the network entity may determine that the beam lock may (or may not) be supported for the first and second UL RSs.

Alternatively, or in addition thereto, the beam lock capability report may also comprise one or more angle tolerances (e.g., azimuth angle tolerance and/or zenith angle tolerance) due to changes in two TX beams between two transmitted resources. The one or more angle tolerances may define a cutoff (e.g., in angle) in which the two TX beams are considered to be the same or different TX beams. For example, if the angle tolerance is set at 5° and the measurement report indicates that the angles of departure (AoD) of the first and second UL RSs differ by less (or more) than 5°, the UE and/or the network entity may determine that the two TX beams are the same (or different). That is, the UE and/or the network entity may determine that the beam lock is (or is not) supported for the first and second UL RSs. There may also be time-based tolerances.

In an aspect, the beam lock report in block 840 may include any changes in the TX beams used to transmit the plurality of uplink signals. As an example, assume that first and second TX beams are used to respectively transmit the first and second UL RSs. In this instance, the beam lock report may include whether there are any changes between the first and second TX beams, and if so, how much change. For example, the beam lock report may include changes in TX powers and/or changes in angles (azimuth and/or zenith). Based on such changes, the UE and/or the network may determine whether the first and second TX beams are the same or different (i.e., determine whether the beam lock is supported). That is, the UE and/or the network entity may determine that the beam lock is (or is not) be supported for the first and second UL RSs.

The beam lock capability provided in block 820 may include other beam lock support capability information regarding the UE. The beam lock capability report may include any one or more of a band capability, a band pair capability, a component carrier (CC) capability, a CC pair capability, a bandwidth part (BWP) capability, a BWP pair capability, a maximum beam lock capability, a maximum distance capability, a maximum power difference capability, a minimum duration capability, among others. Note that a BWP is a contiguous set of PRBs selected from a contiguous subset of the common RBs for a given numerology on a given carrier.

The band capability indicates whether the UE is capable of supporting beam lock between two resources when the two resources are in the same band. For example, the band capability may indicate that the UE is able to support a beam lock for two PRS in band "X." When there are multiple combinations of two resources in the band, the band capability may indicate support for one or more of the multiple combinations in the band. When there are multiple bands, the band capability may indicate support for one or more combinations in one or more bands.

The band pair capability indicates whether the UE is capable of supporting beam lock between two resources when the two resources are in a pair of bands. For example, the band pair capability may indicate that the UE is able to support beam lock for a first resource in band "X" and second resource in band "Y." When there are multiple combinations of two resources in the band pair, the band capability may indicate support for one or more of the multiple combinations in the band pair. When there are more than two bands, the band pair capability may indicate support for one or more combinations in one or more band pairs.

The CC capability indicates whether the UE is capable of supporting beam lock between two resources when the two resources are in the same CC. When there are multiple combinations of two resources in the CC, the CC capability may indicate support for one or more of the multiple combinations in the CC. When there are multiple CCs, the CC capability may indicate support for one or more combinations in one or more CCs.

The CC pair capability indicates whether the UE is capable of supporting beam lock between two resources when the two resources are in a pair of CCs. When there are multiple combinations of two resources in the CC pair, the band capability may indicate support for one or more of the multiple combinations in the CC pair. When there are more than two CCs, the CC pair capability may indicate support for one or more combinations in one or more CC pairs.

The BWP capability indicates whether the UE is capable of supporting beam lock between two resources when the two resources are in the same BWP. When there are multiple combinations of two resources in the BWP, the BWP capability may indicate support for one or more of the multiple combinations in the BWP. When there are multiple BWPs, the BWP capability may indicate support for one or more combinations in one or more BWPs.

The BWP pair capability indicates whether the UE is capable of supporting beam lock between two resources when the two resources are in a pair of BWPs. When there are multiple combinations of two resources in the BWP pair, the band capability may indicate support for one or more of the multiple combinations in the BWP pair. When there are more than two BWPs, the BWP pair capability may indicate support for one or more combinations in one or more BWP pairs.

The maximum beam lock capability indicates a maximum number of beam lock settings (e.g., beam weights, AGC settings, power levels, etc.) that the UE is capable of supporting. More settings supported means that more memory may be necessary to store the settings. The memory requirement may also depend on the exact configuration. For example, if the beam lock is for a contiguous set of symbols, then little to no memory may be required since the beam lock may be kept for those symbols. On the other hand, if it is required to change the beam and return back to the "locked" beam later, then more memory may be required.

The maximum distance capability indicates a maximum difference in time (e.g., number of slots, subframes, frames, msecs, etc.) and/or in frequency (number of subcarriers, bandwidth, etc.) between two resources for which the UE is capable of supporting beam lock.

The maximum power difference capability indicates a maximum difference in TX powers of two transmission resources that the UE is capable of when supporting beam lock. As an illustration, if the maximum power difference is zero, then the two SRS resources should be transmitted at the same power level for the two SRS signals to be transmitted using the same TX beam.

The minimum duration capability indicates a minimum duration necessary after the UE receives a beam lock request to apply a request for transmitting a SRS resource with the same TX beam as another SRS resource and/or to apply a request of receiving a PRS resource on the same RX beam as another PRS resource. In general, the minimum duration capability may indicate an amount of time (e.g., number of slots, subframes, frames, msecs, etc.) that the UE may need after receiving the request (e.g., in a DCI) to comply with the beam lock request.

As indicated in the above examples, the beam lock request may involve a beam lock on two or more PRS on the downlink or two or more SRS on the uplink. For example, a beam lock request may be in a DCI that indicates that for PRS resource "X," the UE should use the same RX beam as for PRS resource "Y." However, it should be noted that the beam lock request need not be between the same type of signals. That is, the beam lock request may involve different types of signals. For example, a beam lock request may be in a DCI that indicates that for PRS resource "X," the UE should use the same RX beam as for SSB "Y," or for PRS resource "X," the UE should use the same RX beam as for CSI-RS "Y."

Also as indicated in the above examples, the beam lock request may specify two or more signals of the plurality of signals to which the beam lock is to be applied. Alternatively, the beam lock request may specify a time window (e.g., two slots, four subframes, 10 slots, 10 msecs, one frame, etc.) during which the beam lock is to be applied to the plurality of signals within the time window. In an aspect, the beam lock may be applied to all signals within the time window. In other words, the beam lock request may be a request to not change the RX/TX beam for reception/transmission of any signal within the time window.

In another aspect, the beam lock may be applied only to reference signals within the time window. In other words, the beam lock request may be a request to not change the RX/TX beam for reception/transmission of any reference signal within the time window, but the RX/TX beam may change for all other signals.

In yet another aspect, the beam lock may be applied only to particular signals, such as positioning signals, within the time window. For example, the beam lock may be applied only to PRS within the time window when the beam lock request is a request to receive using the same RX beam. In other words, the beam lock request may be a request to not change the RX beam for reception of any PRS within the time window, but the RX beam may be changed for all other signals. As another example, the beam lock may be applied only to SRS within the time window when the beam lock request is a request to transmit using the same TX beam. In other words, the beam lock request may be a request to not change the TX beam for transmission of any SRS within the time window, but the TX beam may be changed for all other signals.

Figure 9A:
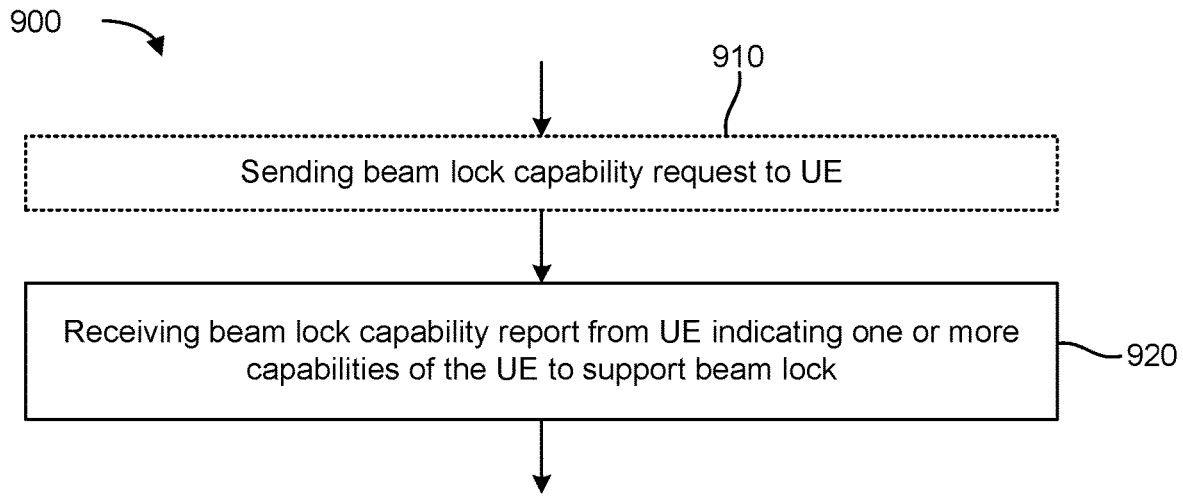
FIGS. 9A and 9B are flow charts of exemplary methods performed by a network entity for supporting beam lock, according to aspects of the disclosure.
Figure 9B:
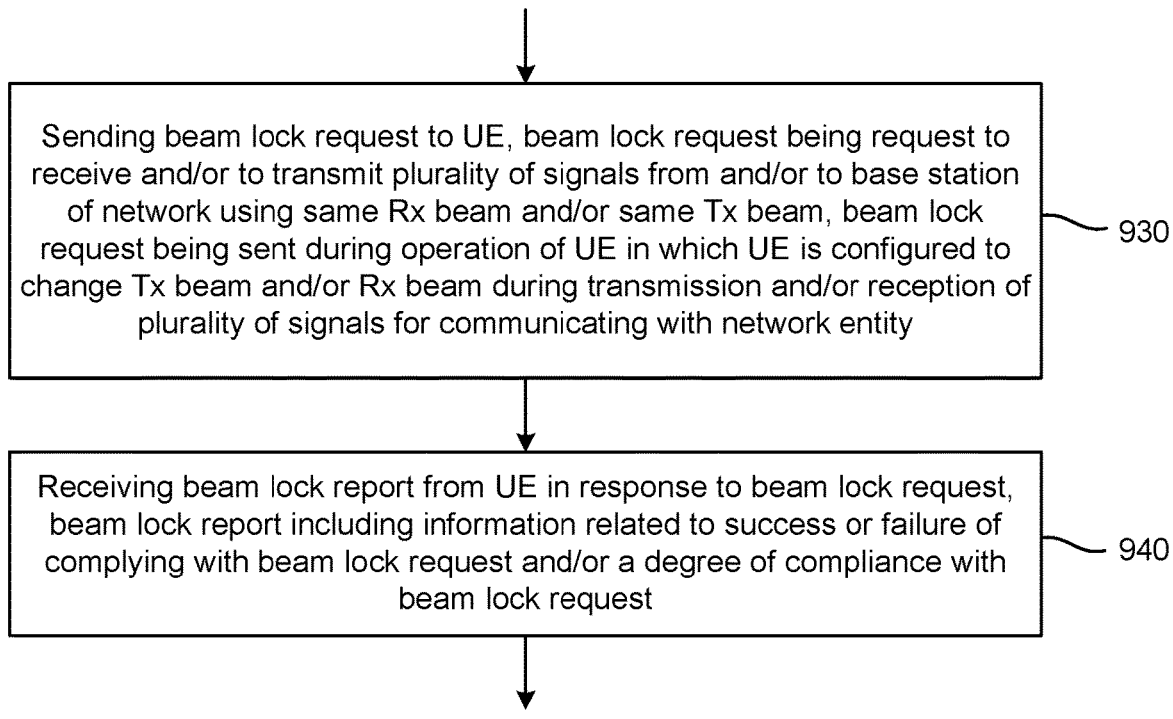

FIGS. 9A and 9B are flow charts of an exemplary method 900 performed by a network entity (e.g., a location server, a base station, etc.) configured to support beam lock. Similar to the method 800, the method 900 is separated into two flow charts to indicate that the processes of the illustrated flow charts, while related, need not take place contemporaneously. In an aspect, where the network entity is a base station, the method 900 may be performed by WWAN transceiver 350, processing system 384, memory component 386, and/or positioning component 388, any or all of which may be considered means for performing the operations of method 900. In an aspect, where the network entity is a network entity (e.g., location server 230, LMF 270, SLP 272), the method 900 may be performed by network interface(s) 390, processing system 394, memory component 396, and/or positioning component 398, any or all of which may be considered means for performing the operations of method 900.

FIG. 9A is a flow chart of the network entity being informed of a UE's beam lock capabilities. In block 920, the network entity receives a beam lock capability report from a UE (e.g., any of the UEs described herein). The beam lock capability may be received on the UE's initiative. Alternatively, the beam lock capability report may be received in response to the network entity sending a beam lock capability request in block 910.

FIG. 9B is a flow chart of the network entity engaging with the UE to perform a beam lock. In block 930, the network entity sends a beam lock request to the UE. The beam lock request may be sent during normal operation of the UE. The beam lock request may be a receive beam lock request and/or a transmit beam lock request. The beam lock request may be implicit or explicit, and may be sent in a DCI and/or in a MAC-CE.

In block 940, the network entity receives a beam lock report from the UE in response to sending the beam lock request.

Figure 10:
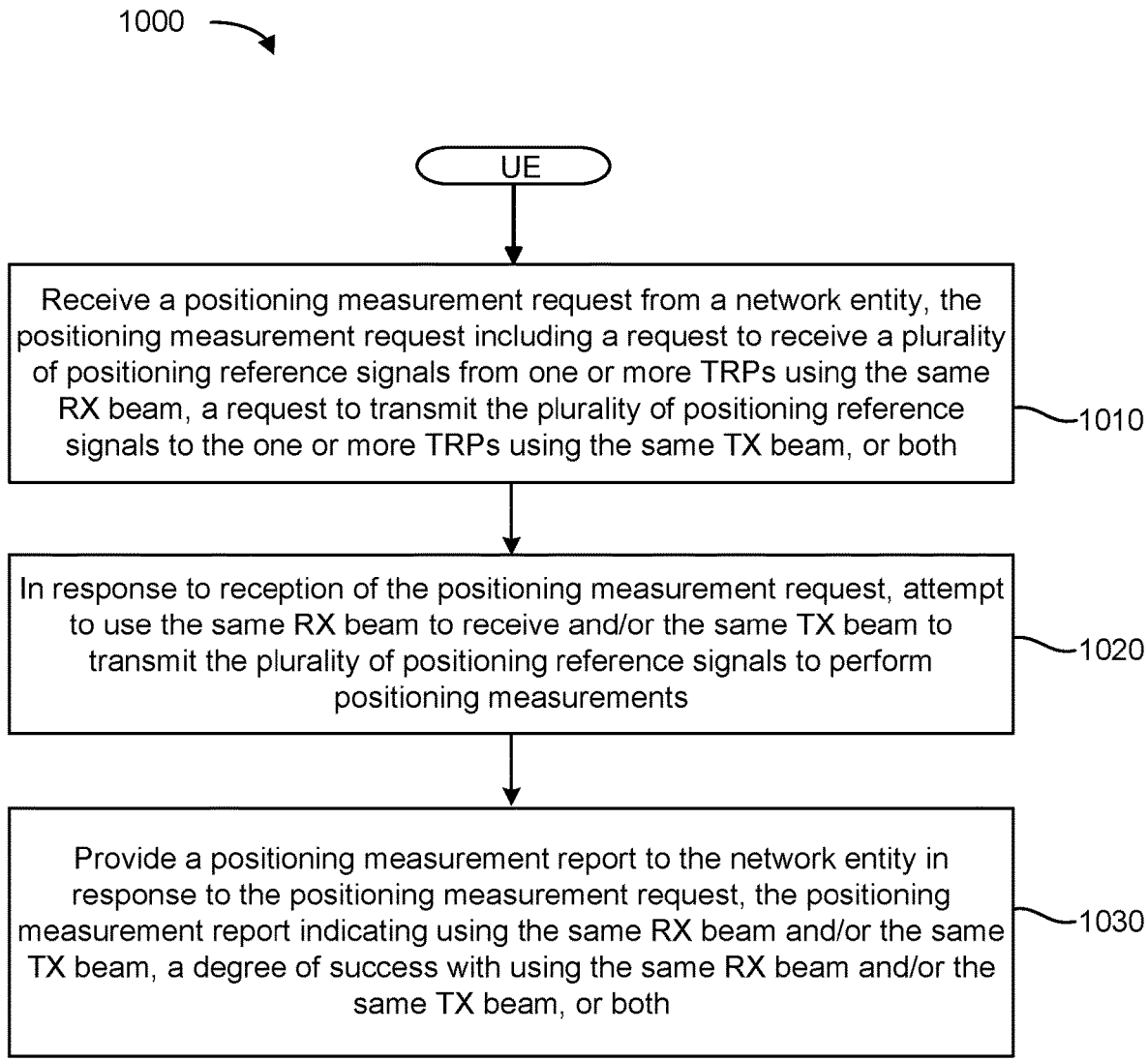
FIGS. 10 and 11 illustrate exemplary methods of wireless communication, according to aspects of the disclosure.

FIG. 10 illustrates an exemplary method 1000 for wireless communication, according to aspects of the disclosure. In an aspect, the method 1000 may be performed by a UE in a multi-beam communication system (e.g., any of the UEs described herein).

At 1010, the UE receives a positioning measurement request (including or corresponding to a beam lock request) from a network entity (e.g., a base station, location server, etc.). In an aspect, the positioning measurement request may include a request to receive a plurality of positioning reference signals from one or more TRPs using the same RX beam, a request to transmit the plurality of positioning reference signals to the one or more TRPs using the same TX beam, or both. In an aspect, operation 1010 may be performed by WWAN transceiver 310, processing system 332, memory component 340, and/or positioning component 342, any or all of which may be considered means for performing operation 1010.

At 1020, in response to reception of the positioning measurement request, the UE attempts to use the same RX beam to receive and/or the same TX beam to transmit the plurality of positioning reference signals to perform positioning measurements. In an aspect, operation 1020 may be performed by WWAN transceiver 310, processing system 332, memory component 340, and/or positioning component 342, any or all of which may be considered means for performing operation 1020.

At 1030, the UE provides a positioning measurement report (including or corresponding to a beam lock report) to the network entity in response to the positioning measurement request. In an aspect, the positioning measurement report may indicate using the same RX beam and/or the same TX beam (e.g., may include information related to the success or failure of attempting to use the same RX beam and/or the same TX beam), a degree of success with using the same RX beam and/or the same TX beam, or both. Alternatively, or additionally, the positioning measurement report may indicate which RX beam (or which RX beams, if the UE was not able to use the same RX beam) was used for the positioning measurements. In an aspect, operation 1030 may be performed by WWAN transceiver 310, processing system 332, memory component 340, and/or positioning component 342, any or all of which may be considered means for performing operation 1030.

Figure 11:
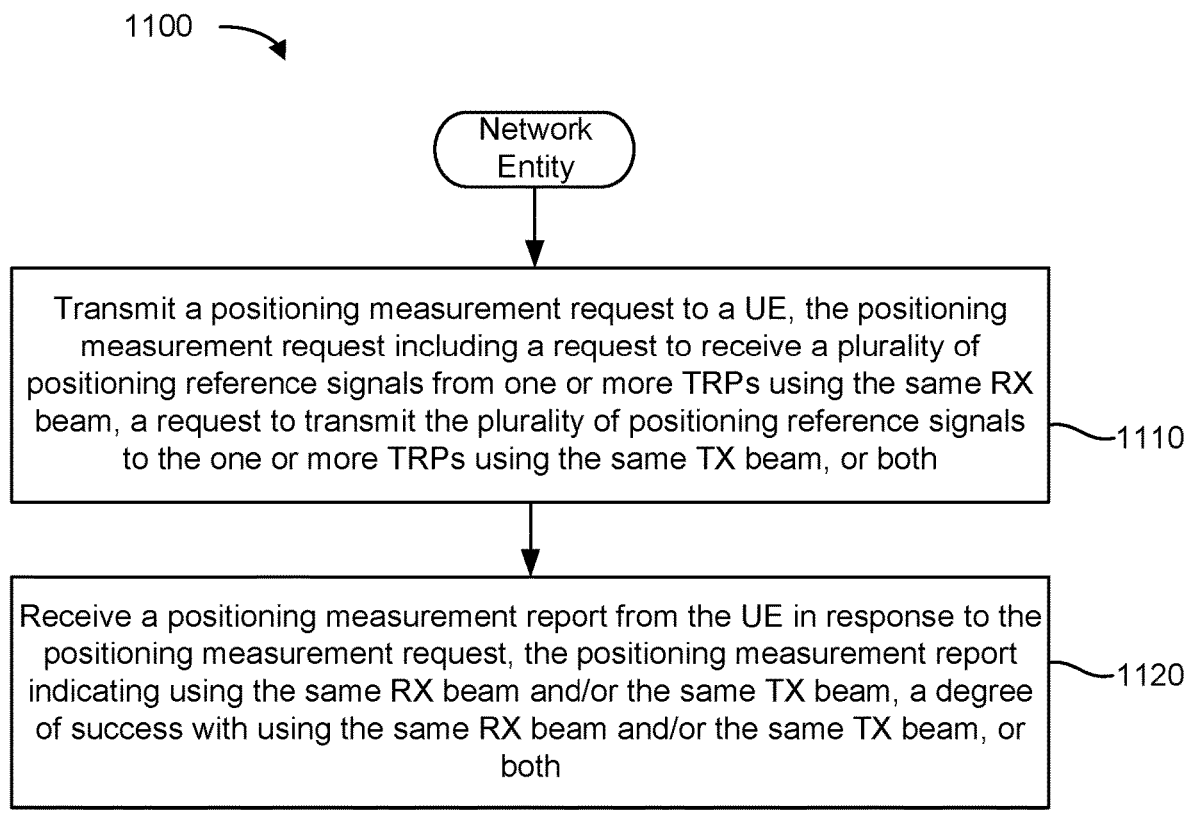

FIG. 11 illustrates an exemplary method 1100 for wireless communication, according to aspects of the disclosure. In an aspect, the method 1100 may be performed by a network entity in a multi-beam communication system (e.g., a location server, a base station, etc.).

At 1110, the network entity transmits a positioning measurement request (including or corresponding to a beam lock request) to a UE (e.g., any of the UEs described herein). In an aspect, the positioning measurement request may include a request to receive a plurality of positioning reference signals from one or more TRPs using the same RX beam, a request to transmit the plurality of positioning reference signals to the one or more TRPs using the same TX beam, or both. In an aspect, where the network entity is a base station, operation 1110 may be performed by WWAN transceiver 350, processing system 384, memory component 386, and/or positioning component 388, any or all of which may be considered means for performing this operation. In an aspect, where the network entity is a network entity (e.g., location server 230, LMF 270, SLP 272), operation 1110 may be performed by network interface(s) 390, processing system 394, memory component 396, and/or positioning component 398, any or all of which may be considered means for performing this operation.

At 1120, the network entity receives a positioning measurement report (including or corresponding to a beam lock report) from the UE in response to the positioning measurement request. In an aspect, the positioning measurement report may indicate using the same RX beam and/or the same TX beam (e.g., may include information related to success or failure of attempting to use the same RX beam and/or the same TX beam), a degree of success with using the same RX beam and/or the same TX beam, or both. Alternatively, or additionally, the positioning measurement report may indicate which RX beam (or which RX beams, if the UE was not able to use the same RX beam) was used for the positioning measurements. In an aspect, where the network entity is a base station, operation 1120 may be performed by WWAN transceiver 350, processing system 384, memory component 386, and/or positioning component 388, any or all of which may be considered means for performing this operation. In an aspect, where the network entity is a network entity (e.g., location server 230, LMF 270, SLP 272), operation 1120 may be performed by network interface(s) 390, processing system 394, memory component 396, and/or positioning component 398, any or all of which may be considered means for performing this operation.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a general purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods, sequences and/or algorithms described in connection with the aspects disclosed herein may be embodied directly in hardware, in a software module executed by a processor, or in a combination of the two. A software module may reside in random access memory (RAM), flash memory, read-only memory (ROM), erasable programmable ROM (EPROM), electrically erasable programmable ROM (EEPROM), registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., UE). In the alternative, the processor and the storage medium may reside as discrete components in a user terminal.

In one or more exemplary aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

While the foregoing disclosure shows illustrative aspects of the disclosure, it should be noted that various changes and modifications could be made herein without departing from the scope of the disclosure as defined by the appended claims. The functions, steps and/or actions of the method claims in accordance with the aspects of the disclosure described herein need not be performed in any particular order. Furthermore, although elements of the disclosure may be described or claimed in the singular, the plural is contemplated unless limitation to the singular is explicitly stated.

What is claimed is:

1. A method performed by a user equipment (UE) in a multi- beam communication system, the method comprising:

receiving a positioning measurement request from a network entity;

in response to reception of the positioning measurement request, attempting to use a same receive (RX) beam to receive a plurality of positioning reference signals from one or more transmission-reception points (TRPs) and/or to use a same transmit (TX) beam to transmit the plurality of positioning reference signals to the one or more TRPs; and providing a positioning measurement report to the network entity in response to the positioning measurement request, the positioning measurement report indicating that the same RX beam and/or the same TX beam was used, a degree of success with using the same RX beam and/or the same TX beam, or both.

2. The method of claim 1, wherein:
the plurality of positioning reference signals comprises a plurality of downlink positioning reference signals, and
the positioning measurement report comprises any one or more of reference signal received powers (RSRPs), times of arrival (ToAs), received signal time differences (RSTDs), and angles of arrival (AoAs) of the plurality of positioning reference signals.

3. The method of claim 1, wherein the positioning measurement request is received during operation of the UE in which the UE is configured to change the TX beam during transmission of the plurality of positioning reference signals and/or change the RX beam during reception of the plurality of positioning reference signals.

4. The method of claim 1, wherein the positioning measurement request is received in a downlink control information (DCI) and/or in a media access control (MAC) control element (CE).

5. The method of claim 1, wherein the positioning measurement request includes an explicit beam lock request.

6. The method of claim 1, wherein a beam lock request is implicitly assumed based on the positioning measurement request being for positioning purposes.

7. The method of claim 1, wherein:
the plurality of positioning reference signals is a plurality of downlink positioning reference signals including at least first and second downlink positioning reference signals,
the positioning measurement request includes a receive beam lock request that is a request to receive the first and second downlink positioning reference signals using the same RX beam,
the positioning measurement request is a request to measure the first and second downlink positioning reference signals at the UE, and
a beam lock report is provided to the network entity together with the positioning measurement report of the first and second downlink positioning reference signals.

8. The method of claim 7, wherein the receive beam lock request explicitly requests that the first and second downlink positioning reference signals be received using the same RX beam.

9. The method of claim 7, wherein:
first and second RX beams are respectively used to receive the first and second downlink positioning reference signals, and
the positioning measurement report includes:
whether there are any changes between the first and second RX beams, and/or
whether there are any changes in settings between the first and second RX beams in receiving the first and second downlink positioning reference signals.

10. The method of claim 9, wherein:
the changes between the first and second RX beams include changes in RSRP and/or changes in angles, and/or
the changes in the settings include changes in RX automatic gain control (AGC).

11. The method of claim 1, further comprising:
providing a beam lock capability report to the network entity, the beam lock capability report comprising:
an RSRP tolerance due to changes in two RX beams between two received resources, the RSRP tolerance defining a cutoff in which the two RX beams are considered to be same or different RX beams, and/or
an angle tolerance due to changes in two RX beams between two received resources, the angle tolerance defining a cutoff in which the two RX beams are considered to be same or different RX beams.

12. The method of claim 11, wherein the angle tolerance comprises an azimuth angle tolerance or a zenith angle tolerance.

13. The method of claim 1, wherein:
the plurality of positioning reference signals is a plurality of uplink positioning reference signals including at least first and second uplink positioning reference signals,
the positioning measurement request includes a transmit beam lock request that is a request to transmit the first and second uplink positioning reference signals using the same TX beam,
the positioning measurement request is a request to transmit the first and second uplink positioning reference signals, and
the positioning measurement report includes a beam lock report provided together with transmission of the first and second uplink positioning reference signals.

14. The method of claim 13, wherein the transmit beam lock request explicitly requests that the first and second uplink positioning reference signals be transmitted using the same TX beam.

15. The method of claim 13, wherein:
first and second TX beams are respectively used to transmit the first and second uplink positioning reference signals, and
the positioning measurement report includes:
whether there are any changes between the first and second TX beams, and/or
whether there are any changes in settings between the first and second TX beams in transmitting the first and second uplink positioning reference signals.

16. The method of claim 15, wherein:
the changes between the first and second TX beams include changes in angles, and/or
the changes in the settings include changes in TX powers.

17. The method of claim 1, further comprising:
providing a beam lock capability report to the network entity, the beam lock capability report comprising:
a TX power tolerance due to changes in two TX beams between two transmitted resources, the TX power tolerance defining a cutoff in which the two TX beams are considered to be same or different TX beams, and/or
an angle tolerance due to changes in two TX beams between two transmitted resources, the angle tolerance defining a cutoff in which the two TX beams are considered to be same or different TX beams.

18. The method of claim 1, further comprising:
providing a beam lock capability report to the network entity indicating one or more capabilities of the UE to support beam lock, the beam lock capability report comprising any one or more of:
a band capability indicating whether the UE is capable of supporting beam lock between two resources when the two resources are in a same band, a band pair capability indicating whether the UE is capable of supporting beam lock between two resources when the two resources are in a pair of bands, a component carrier (CC) capability indicating whether the UE is capable of supporting beam lock between two resources when the two resources are in a same CC, a CC pair capability indicating whether the UE is capable of supporting beam lock between two resources when the two resources are in a pair of CCs, a bandwidth part (BWP) capability indicating whether the UE is capable of supporting beam lock between two resources when the two resources are in a same BWP, a BWP pair capability indicating whether the UE is capable of supporting beam lock between two resources when the two resources are in a pair of BWPs, a maximum beam lock capability indicating a maximum number of beam lock settings that the UE is capable of supporting, a maximum distance capability indicating a maximum difference in time and/or in frequency between two resources for which the UE is capable of supporting beam lock, a maximum power difference capability indicating a maximum difference in TX powers of two transmission resources that the UE is capable of when supporting beam lock, and a minimum duration capability indicating a minimum duration necessary after the UE receives the positioning measurement request to apply a request for transmitting a sounding reference signal (SRS) resource with a same beam as another SRS resource.

19. The method of claim 1, further comprising:
receiving a beam lock capability request from the network entity; and
providing a beam lock capability report to the network entity in response to receiving the beam lock capability request.

20. The method of claim 1, wherein the positioning measurement request specifies two or more positioning reference signals of the plurality of positioning reference signals to which a beam lock is to be applied.

21. The method of claim 1, wherein the positioning measurement request specifies a time window during which a beam lock is to be applied to two or more positioning reference signals of the plurality of positioning reference signals within the time window.

22. The method of claim 21, wherein the beam lock is applied to all positioning reference signals of the plurality of positioning reference signals within the time window.

23. The method of claim 21, wherein the beam lock is applied only to a specific type of signals of the plurality of positioning reference signals within the time window.

24. The method of claim 23, wherein the beam lock is applied only to positioning reference signals (PRS) within the time window when the positioning measurement request includes a request to receive using the same RX beam, and only to sounding reference signals (SRS) within the time window when the positioning measurement request includes a request to transmit using the same TX beam.

25. The method of claim 1, wherein the positioning measurement report is an acknowledgment (ACK) or a negative acknowledgment (NACK) to the positioning measurement request.

26. A method performed by a network entity in a multi-beam communication system, the method comprising:
transmitting a positioning measurement request to a user equipment (UE); and
receiving a positioning measurement report from the UE in response to the positioning measurement request, the positioning measurement report indicating that a same receive (RX) beam was used to receive a plurality of positioning reference signals from one or more transmission-reception points (TRPs) and/or that a same transmit (TX) beam was used to transmit the plurality of positioning reference signals to the one or more TRPs, a degree of success with using the same RX beam and/or the same TX beam, or both.

27. The method of claim 26, wherein:
the plurality of positioning reference signals comprises a plurality of downlink positioning reference signals, and
the positioning measurement report comprises any one or more of reference signal received powers (RSRPs), times of arrival (ToAs), received signal time differences (RSTDs), and angles of arrival (AoAs) of the plurality of positioning reference signals.

28. The method of claim 26, wherein the positioning measurement request is transmitted during an operation of the UE in which the UE is configured to change the TX beam during transmission of the plurality of positioning reference signals and/or change the RX beam during reception of the plurality of positioning reference signals.

29. The method of claim 26, wherein the positioning measurement request is transmitted in a downlink control information (DCI) and/or in a media access control (MAC) control element (CE).

30. The method of claim 26, wherein the positioning measurement request includes an explicit beam lock request.

31. The method of claim 26, wherein a beam lock request is implicitly assumed based on the positioning measurement request being for positioning purposes.

32. The method of claim 26, wherein:
the plurality of positioning reference signals is a plurality of downlink positioning reference signals including at least first and second downlink positioning reference signals,
the positioning measurement request includes a receive beam lock request that is a request to receive the first and second downlink positioning reference signals using the same RX beam,
the positioning measurement request is a request to measure the first and second downlink positioning reference signals at the UE, and
a beam lock report is provided to the network entity together with the positioning measurement report of the first and second downlink positioning reference signals.

33. The method of claim 32, wherein the receive beam lock request explicitly requests that the first and second downlink positioning reference signals be received using the same RX beam.

34. The method of claim 32, wherein:
first and second RX beams are respectively used to receive the first and second downlink positioning reference signals, and
the positioning measurement report includes:
whether there are any changes between the first and second RX beams, and/or whether there are any changes in settings between the first and second RX beams in receiving the first and second downlink positioning reference signals.

35. The method of claim 34, wherein:
the changes between the first and second RX beams include changes in RSRP and/or changes in angles, and/or
the changes in the settings include changes in RX automatic gain control (AGC).

36. The method of claim 26, further comprising:
receiving a beam lock capability report from the UE, the beam lock capability report comprising:
an RSRP tolerance due to changes in two RX beams between two received resources, the RSRP tolerance defining a cutoff in which the two RX beams are considered to be same or different RX beams, and/or
an angle tolerance due to changes in two RX beams between two received resources, the angle tolerance defining a cutoff in which the two RX beams are considered to be same or different RX beams.

37. The method of claim 36, wherein the angle tolerance comprises an azimuth angle tolerance or a zenith angle tolerance.

38. The method of claim 26, wherein:
the plurality of positioning reference signals is a plurality of uplink positioning reference signals including at least first and second uplink positioning reference signals,
the positioning measurement request includes a transmit beam lock request that is a request to transmit the first and second uplink positioning reference signals using the same TX beam,
the positioning measurement request is a request to transmit the first and second uplink positioning reference signals, and
the positioning measurement report includes a beam lock report provided together with transmission of the first and second uplink positioning reference signals.

39. The method of claim 38, wherein the transmit beam lock request explicitly requests that the first and second uplink positioning reference signals be transmitted using the same TX beam.

40. The method of claim 38, wherein:
first and second TX beams are respectively used to transmit the first and second uplink positioning reference signals, and
the positioning measurement report includes:
whether there are any changes between the first and second TX beams, and/or
whether there are any changes in settings between the first and second TX beams in transmitting the first and second uplink positioning reference signals.

41. The method of claim 40, wherein:
the changes between the first and second TX beams include changes in angles, and/or
the changes in the settings include changes in TX powers.

42. The method of claim 26, further comprising:
receiving a beam lock capability report from the UE, the beam lock capability report comprising:
a TX power tolerance due to changes in two TX beams between two transmitted resources, the TX power tolerance defining a cutoff in which the two TX beams are considered to be same or different TX beams, and/or
an angle tolerance due to changes in two TX beams between two transmitted resources, the angle tolerance defining a cutoff in which the two TX beams are considered to be same or different TX beams.

43. The method of claim 26, further comprising:
receiving a beam lock capability report from the UE indicating one or more capabilities of the UE to support beam lock, the beam lock capability report comprising any one or more of:
a band capability indicating whether the UE is capable of supporting beam lock between two resources when the two resources are in a same band,
a band pair capability indicating whether the UE is capable of supporting beam lock between two resources when the two resources are in a pair of bands,
a component carrier (CC) capability indicating whether the UE is capable of supporting beam lock between two resources when the two resources are in a same CC,
a CC pair capability indicating whether the UE is capable of supporting beam lock between two resources when the two resources are in a pair of CCs,
a bandwidth part (BWP) capability indicating whether the UE is capable of supporting beam lock between two resources when the two resources are in a same BWP,
a BWP pair capability indicating whether the UE is capable of supporting beam lock between two resources when the two resources are in a pair of BWPs,
a maximum beam lock capability indicating a maximum number of beam lock settings that the UE is capable of supporting,
a maximum distance capability indicating a maximum difference in time and/or in frequency between two resources for which the UE is capable of supporting beam lock,
a maximum power difference capability indicating a maximum difference in TX powers of two transmission resources that the UE is capable of when supporting beam lock, and
a minimum duration capability indicating a minimum duration necessary after the UE receives the positioning measurement request to apply a request for transmitting a sounding reference signal (SRS) resource with a same beam as another SRS resource.

44. The method of claim 26, further comprising:
transmitting a beam lock capability request to the UE; and
receiving a beam lock capability report from the UE in response to transmitting the beam lock capability request.

45. The method of claim 26, wherein the positioning measurement request specifies two or more positioning reference signals of the plurality of positioning reference signals to which a beam lock is to be applied.

46. The method of claim 26, wherein the positioning measurement request specifies a time window during which a beam lock is to be applied to two or more positioning reference signals of the plurality of positioning reference signals within the time window.

47. The method of claim 46, wherein the beam lock is applied to all positioning reference signals of the plurality of positioning reference signals within the time window.

48. The method of claim 46, wherein the beam lock is applied only to a specific type of signals of the plurality of positioning reference signals within the time window.

49. The method of claim 48, wherein the beam lock is applied only to positioning reference signals (PRS) within the time window when the positioning measurement request includes a request to receive using the same RX beam, and only to sounding reference signals (SRS) within the time window when the positioning measurement request includes a request to transmit using the same TX beam.

50. The method of claim 26, wherein the positioning measurement report is an acknowledgment (ACK) or a negative acknowledgment (NACK) to the positioning measurement request.

51. A user equipment (UE), comprising:
a memory;
at least one transceiver; and
at least one processor communicatively coupled to the memory and the at least one transceiver, the at least one processor configured to:
receive, via the at least one transceiver, a positioning measurement request from a network entity;
attempt, in response to reception of the positioning measurement request, to use a same receive (RX) beam to receive a plurality of positioning reference signals from one or more transmission-reception points (TRPs) and/or to use a same transmit (TX) beam to transmit the plurality of positioning reference signals to the one or more TRPs; and
cause the at least one transceiver to transmit a positioning measurement report to the network entity in response to the positioning measurement request, the positioning measurement report indicating that the same RX beam and/or the same TX beam was used, a degree of success with using the same RX beam and/or the same TX beam, or both.

52. A network entity, comprising:
a memory;
a communication device; and
at least one processor communicatively coupled to the memory and the communication device, the at least one processor configured to:
cause the communication device to transmit a positioning measurement request to a user equipment (UE); and
receive, via the communication device, a positioning measurement report from the UE in response to the positioning measurement request, the positioning measurement report indicating that a same receive (RX) beam was used to receive a plurality of positioning reference signals from one or more transmission-reception points (TRPs) and/or that a same transmit (TX) beam was used to transmit the plurality of positioning reference signals to the one or more TRPs, a degree of success with using the same RX beam and/or the same TX beam, or both.

53. The network entity of claim 52, wherein:
the network entity comprises a base station, and
the communication device comprises at least one transceiver.

54. The network entity of claim 52, wherein:
the network entity comprises a location server, and
the communication device comprises at least one network interface.

55. A user equipment (UE), comprising:
means for receiving a positioning measurement request from a network entity;
means for attempting, in response to reception of the positioning measurement request, to use a same receive (RX) beam to receive a plurality of positioning reference signals from one or more transmission-reception points (TRPs) and/or to use a same transmit (TX) beam to transmit the plurality of positioning reference signals to the one or more TRPs; and
means for providing a positioning measurement report to the network entity in response to the positioning measurement request, the positioning measurement report indicating that the same RX beam and/or the same TX beam was used, a degree of success with using the same RX beam and/or the same TX beam, or both.

56. A network entity, comprising:
means for transmitting a positioning measurement request to a user equipment (UE); and
means for receiving a positioning measurement report from the UE in response to the positioning measurement request, the positioning measurement report indicating that a same receive (RX) beam was used to receive a plurality of positioning reference signals from one or more transmission-reception points (TRPs) and/or that a same transmit (TX) beam was used to transmit the plurality of positioning reference signals to the one or more TRPs, a degree of success with using the same RX beam and/or the same TX beam, or both.

57. A non-transitory computer-readable medium storing computer-executable instructions, the computer-executable instructions comprising:
at least one instruction instructing a user equipment (UE) to receive a positioning measurement request from a network entity;
at least one instruction instructing the UE to attempt, in response to reception of the positioning measurement request, to use a same receive (RX) beam to receive a plurality of positioning reference signals from one or more transmission-reception points (TRPs) and/or to use a same transmit (TX) beam to transmit the plurality of positioning reference signals to the one or more TRPs; and
at least one instruction instructing the UE to provide a positioning measurement report to the network entity in response to the positioning measurement request, the positioning measurement report indicating that the same RX beam and/or the same TX beam was used, a degree of success with using the same RX beam and/or the same TX beam, or both.

58. A non-transitory computer-readable medium storing computer-executable instructions, the computer-executable instructions comprising:
at least one instruction instructing a network entity to transmit a positioning measurement request to a user equipment (UE); and
at least one instruction instructing the network entity to receive a positioning measurement report from the UE in response to the positioning measurement request, the positioning measurement report indicating that a same receive (RX) beam was used to receive a plurality of positioning reference signals from one or more transmission-reception points (TRPs) and/or that a same transmit (TX) beam was used to transmit the plurality of positioning reference signals to the one or more TRPs, a degree of success with using the same RX beam and/or the same TX beam, or both.

59. The method of claim 1, wherein the positioning measurement request includes a request to receive a plurality of positioning reference signals from one or more transmission-reception points (TRPs) using the same receive (RX)

beam, a request to transmit the plurality of positioning reference signals to the one or more TRPs using the same transmit (TX) beam, or both.

60. The method of claim 26, wherein the positioning measurement request includes a request to receive a plurality of positioning reference signals from one or more transmission-reception points (TRPs) using the same receive (RX) beam, a request to transmit the plurality of positioning reference signals to the one or more TRPs using the same transmit (TX) beam, or both.

* * * * *